(12) United States Patent
Melo et al.

(10) Patent No.: US 6,279,087 B1
(45) Date of Patent: Aug. 21, 2001

(54) SYSTEM AND METHOD FOR MAINTAINING COHERENCY AND IMPROVING PERFORMANCE IN A BUS BRIDGE SUPPORTING WRITE POSTING OPERATIONS

(75) Inventors: Maria L. Melo; Khaldoun Alzien; Robert C. Elliott, all of Houston; David J. Maguire, Spring, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 08/995,945

(22) Filed: Dec. 22, 1997

(51) Int. Cl.[7] .................................................. G06F 12/16
(52) U.S. Cl. .............................. 711/146; 710/52; 710/129; 711/163
(58) Field of Search ..................................... 711/143, 146, 711/163; 710/129, 52

(56) References Cited

U.S. PATENT DOCUMENTS

| | | | |
|---|---|---|---|
| 5,761,450 | * | 6/1998 | Shah ...................................... 710/107 |
| 5,778,413 | * | 7/1998 | Stevens et al. ........................... 711/5 |
| 5,813,038 | * | 9/1998 | Thome et al. .......................... 711/154 |
| 5,823,241 | * | 10/1998 | Sitzes et al. ........................... 160/107 |
| 5,905,876 | * | 5/1999 | Pawlowski et al. ................... 711/117 |
| 5,938,739 | * | 8/1999 | Collins et al. ............................ 710/5 |
| 5,941,964 | * | 8/1999 | Young et al. ......................... 710/100 |
| 5,987,555 | * | 11/1999 | Alzien et al. ......................... 710/129 |
| 6,021,473 | * | 2/2000 | Davis et al. .......................... 711/141 |

* cited by examiner

*Primary Examiner*—Hiep T. Nguyen
(74) *Attorney, Agent, or Firm*—Conley, Rose & Tayon, PC; B. Noël Kivlin

(57) ABSTRACT

A bridge logic unit provides an interface between a microprocessor coupled to a processor bus, a main memory coupled to memory bus, and a peripheral device coupled to a peripheral bus, such as a PCI bus. To maintain coherency, the bridge logic unit disables write posting in certain specific situations, and flushes posted write transactions before allowing certain read requests to be serviced. More specifically, in one embodiment when a PCI device performs a read to main memory, which may be implemented within the bridge as delayed read, the bus bridge blocks CPU to PCI transactions and flushes any posted CPU to PCI transactions pending in the bridge. The bus bridge enables CPU to PCI posting after the pending CPU to PCI transactions have been flushed and after the snoop phase of a snoop cycle corresponding to the memory read operation completes. In a further embodiment, prior to performing a PCI read cycle on behalf of a read cycle initiated by the microprocessor, the bus bridge determines whether any PCI to memory transactions are pending in the PCI slave transient write buffer. If any posted write transactions reside in the PCI slave transient write buffer, the bus bridge retries the read cycle on the processor bus and blocks any subsequent posting of write transactions to memory from the PCI bus. When the pending PCI to memory transactions have been flushed from the PCI slave transient write buffer, and the microprocessor reattempts the read, the read cycle is initiated on the PCI bus. At this point, PCI to memory write posting is re-enabled.

25 Claims, 14 Drawing Sheets

SYSTEM AND METHOD FOR MAINTAINING COHERENCY AND IMPROVING PERFORMANCE IN A BUS BRIDGE SUPPORTING WRITE POSTING OPERATIONS

BACKGROUND OF THE INVENTION

1. Field of the Invention

This invention relates to computer systems and, more particularly, to integrated bus bridge designs for use in high performance computer systems. The invention also relates to memory coherency in computer systems and to bus bridge designs that support write posting operations.

2. Description of the Related Art

Computer architectures generally include a plurality of devices interconnected by one or more buses. For example, conventional computer systems typically include a CPU coupled through bridge logic to an external main memory. A main memory controller is thus typically incorporated within the bridge logic to generate various control signals for accessing the main memory. An interface to a high bandwidth local expansion bus, such as the Peripheral Component Interconnect (PCI) bus, may also be included as a portion of the bridge logic. Examples of devices which can be coupled to the local expansion bus include network interface cards, video accelerators, audio cards, SCSI adapters, telephony cards, etc. An older-style expansion bus may be supported through yet an additional bus interface to provide compatibility with earlier-version expansion bus adapters. Examples of such expansion buses include the Industry Standard Architecture (ISA) bus, also referred to as the AT bus, the Extended Industry Standard Architecture (EISA) bus, and the Microchannel Architecture (MCA) bus. Various devices may be coupled to this second expansion bus, including a fax/modem card, sound card, etc.

The bridge logic can link or interface more than simply the CPU bus, a peripheral bus such as a PCI bus, and the memory bus. In applications that are graphics intensive, a separate peripheral bus optimized for graphics related transfers may be supported by the bridge logic. A popular example of such a bus is the AGP (Advanced Graphics Port) bus. AGP is generally considered a high performance, component level interconnect optimized for three dimensional graphical display applications, and is based on a set of performance extensions or enhancements to PCI. AGP came about, in part, from the increasing demands placed on memory bandwidths for three dimensional renderings. AGP provided an order of magnitude bandwidth improvement for data transfers between a graphics accelerator and system memory. This allowed some of the three dimensional rendering data structures to be effectively shifted into main memory, relieving the costs of incorporating large amounts of memory local to the graphics accelerator or frame buffer.

AGP uses the PCI specification as an operational baseline, yet provides three significant performance extensions or enhancements to that specification. These extensions include a deeply pipelined read and write operation, demultiplexing of address and data on the AGP bus, and ac timing specifications for faster data transfer rates.

Since computer systems were originally developed for business applications including word processing and spreadsheets, among others, the bridge logic within such systems was generally optimized to provide the CPU with relatively good performance with respect to its access to main memory. The bridge logic generally provided relatively poor performance, however, with respect to main memory accesses by other devices residing on peripheral busses, and similarly provided relatively poor performance with respect to data transfers between the CPU and peripheral busses as well as between peripheral devices interconnected through the bridge logic.

Recently, however, computer systems have been increasingly utilized in the processing of various real time applications, including multimedia applications such as video and audio, telephony, and speech recognition. These systems require not only that the CPU have adequate access to the main memory, but also that devices residing on various peripheral busses such as an AGP bus and a PCI bus have fair access to the main memory. Furthermore, it is often important that transactions between the CPU, the AGP bus and the PCI bus be efficiently handled. The bus bridge logic for a modern computer system should accordingly include mechanisms to efficiently prioritize and arbitrate among the varying requests of devices seeking access to main memory and to other system components coupled through the bridge logic.

To support high performance, many bus bridge designs support write posting operations for write cycles initiated on one or more of the interfaced buses. Specifically, many bus bridge designs allow the bus bridge to receive and "post" a write cycle initiated upon the microprocessor bus or a peripheral bus, such as the PCI bus. Once the write data is received by the bus bridge, the cycle on the processor or peripheral bus can be completed, even though the write data has not yet actually been written into main memory or to a destination bus by the bus bridge. Once a write has been posted in the bus bridge, the bridge may complete the write to the destination at a later time in an efficient manner without stalling the initial write cycle presented on the processor or peripheral bus.

While write posting in bus bridges can greatly improve performance, problems relating to memory coherency can arise. To avoid coherency problems, various ordering rules may be established. For example, if a PCI device issues a request to read data from main memory such as a flag set by the microprocessor indicating that a data transfer from the microprocessor to the PCI bus has been completed, any posted data from the microprocessor to the PCI bus needs to be flushed to assure that the data transfer has actually completed. Similarly, a PCI device may write a block of data to memory, which is posted within the bus bridge. If the microprocessor issues a read request to read a flag from the PCI device to determine whether the data has been transferred to main memory, the posted PCI to memory transactions in the bridge should be flushed prior to initiating the read on the PCI bus. The flushing operations in the above scenarios assure that the device reading the flag does not operate upon data it expects to have already been transferred.

It is desirable to provide mechanisms within a bus bridge of a computer system to allow write posting operations while maintaining coherency.

SUMMARY OF THE INVENTION

The problems outlined above are in large part solved by a system and method for maintaining coherency and improving performance in a bus bridge in accordance with the present invention. In one embodiment, a bridge logic unit provides an interface between a microprocessor coupled to a processor bus, a main memory coupled to memory bus, and a peripheral device coupled to a peripheral bus, such as a PCI bus. To maintain coherency, the bridge logic unit disables write posting in certain specific situations, and flushes posted write transactions before allowing certain read requests to be serviced. More specifically, in one embodiment when a PCI device performs a read to main memory, which may be implemented within the bridge as delayed read, the bus bridge blocks CPU to PCI write posting and flushes any posted CPU to PCI transactions pending in the bridge. The bridge re-enables CPU to PCI posting once the CPU to PCI buffers have been flushed and the snoop phase of the snoop cycle corresponding to the memory read operation is complete. The bus bridge allows the read operation by the PCI device to complete after the pending CPU to PCI transactions have been flushed and read data from main memory available.

In a further embodiment, prior to performing a PCI read cycle on behalf of a read cycle initiated by the microprocessor, the bus bridge determines whether any PCI to memory transactions are pending in the PCI slave transient write buffer. If any posted write transactions reside in the PCI slave transient write buffer, the bus bridge retries the read cycle on the processor bus and blocks any subsequent posting of write transactions to memory from the PCI bus. When the pending PCI to memory transactions have been flushed from the PCI slave transient write buffer, and the microprocessor reattempts the read, the read cycle is initiated on the PCI bus. At this point, PCI to memory write posting is re-enabled.

The bus bridge logic unit may accordingly support write posting operations for write cycles initiated on both the microprocessor bus and the PCI bus while maintaining coherency. Furthermore, the selective blocking of write posting from either the microprocessor bus or the peripheral bus may advantageously accommodate high performance operation.

BRIEF DESCRIPTION OF THE DRAWINGS

Other objects and advantages of the invention will become apparent upon reading the following detailed description and upon reference to the accompanying drawings in which.

Figure 1:
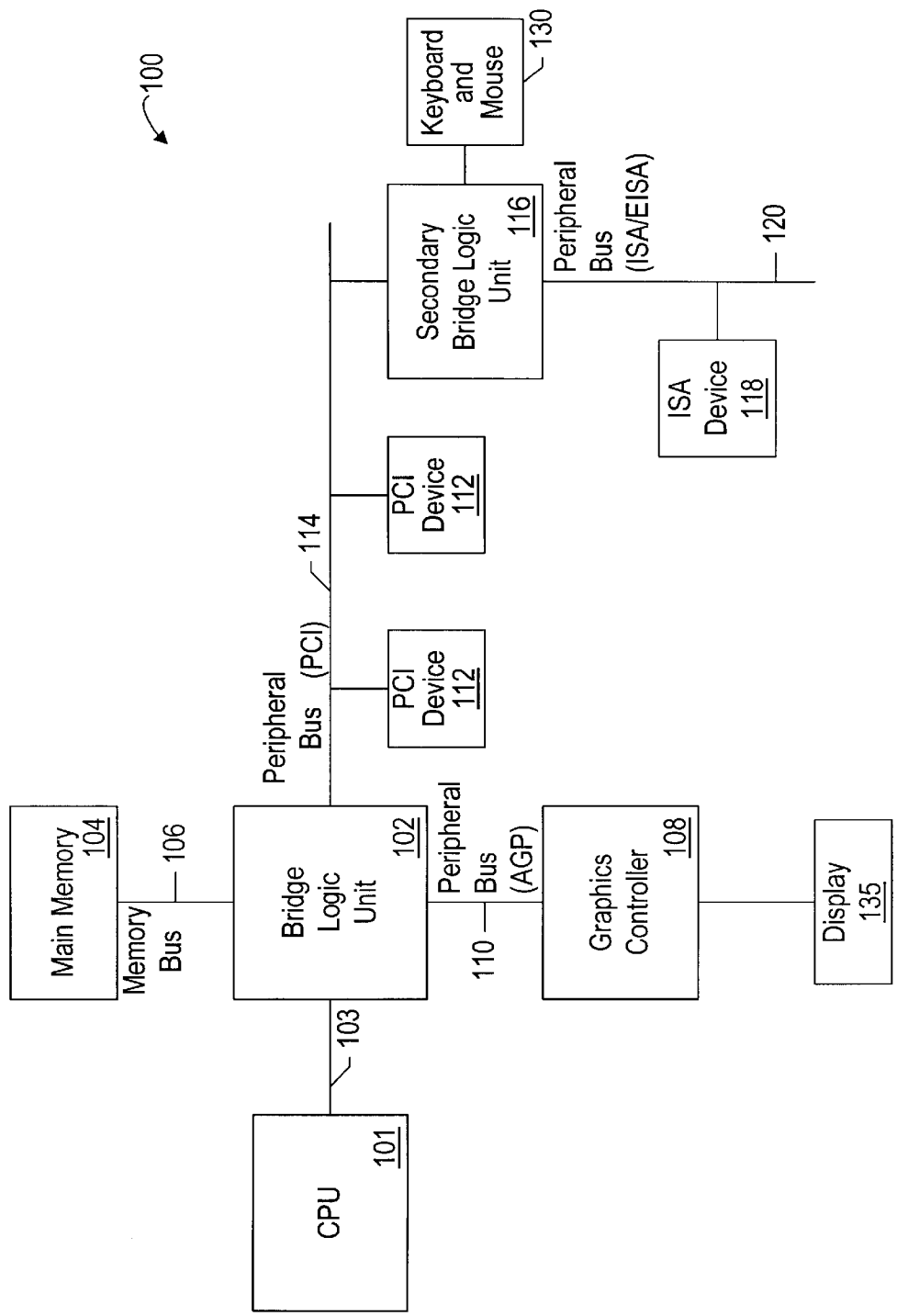
FIG. 1 is a block diagram of a computer system including an integrated bridge logic unit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning now to the drawings, FIG. 1 is a block diagram of a computer system 100 including a CPU (Central Processing Unit) 101 coupled to a variety of system components through an integrated bridge logic unit 102. In the depicted system, a main memory 104 is coupled to bridge logic unit 102 through a memory bus 106, and a graphics controller 108 is coupled to bridge logic unit 102 through an AGP bus 110. Finally, a plurality of PCI devices 112 are coupled to bridge logic unit 102 through a PCI bus 114. A secondary bridge logic unit 116 may further be provided to accommodate an electrical interface to one or more EISA or ISA devices 118 through an EISA/ISA bus 120.

In addition to providing an interface to an ISA/EISA bus, secondary bridge logic unit 116 may further incorporate additional functionality, as desired. For example, in one embodiment, secondary bridge logic unit 116 includes a master PCI arbiter (not shown) for arbitrating ownership of PCI bus 114. Secondary bridge logic unit 116 may additionally incorporate a disk drive controller, an interrupt controller, and power management support functionality. An input/output controller (not shown), either external from or integrated with secondary bridge logic unit 116, may also be included within computer system 100 to provide operational support for a keyboard and mouse 130 and for various serial and parallel ports, as desired.

CPU 101 is illustrative of, for example, a Pentium® Pro microprocessor. It is understood, however, that in other embodiments of computer system 100, alternative types of microprocessors could be employed. An external cache unit (not shown) may further be coupled to CPU bus 103 in other embodiments.

Main memory 104 is a memory in which application programs are stored and from which CPU 101 primarily executes out of. A suitable main memory 104 comprises DRAM (Dynamic Random Access Memory), and preferably a plurality of banks of SDRAM (Synchronous DRAM).

PCI devices 112 are illustrative of a variety of peripheral devices such as, for example, network interface cards, video accelerators, audio cards, hard or floppy disk drives, SCSI (Small Computer Systems Interface) adapters and telephony cards. Similarly, ISA device 118 is illustrative of various types of peripheral devices, such as a modem.

Graphics controller 108 is provided to control the rendering of text and images on a display 135. Graphics controller 108 may embody a typical graphics accelerator generally known in the art to render three-dimensional data structures which can be effectively shifted into and from main memory 104. Graphics controller 108 may therefore be a master of AGP bus 110 in that it can request and receive access to a target interface within bridge logic unit 102 to thereby obtain access to main memory 104. A dedicated graphics bus accommodates rapid retrieval of data from main memory 104. For certain operations, graphics controller 108 may further be configured to generate PCI protocol transactions on AGP bus 110. The AGP interface of bridge logic unit 102 may thus include functionality to support both AGP protocol transactions as well as PCI protocol target and initiator transactions. Display 135 is any electronic display upon which an image or text can be presented. A suitable display 135 includes a cathode ray tube ("CRT"), a liquid crystal display ("LCD"), etc.

Figure 2:
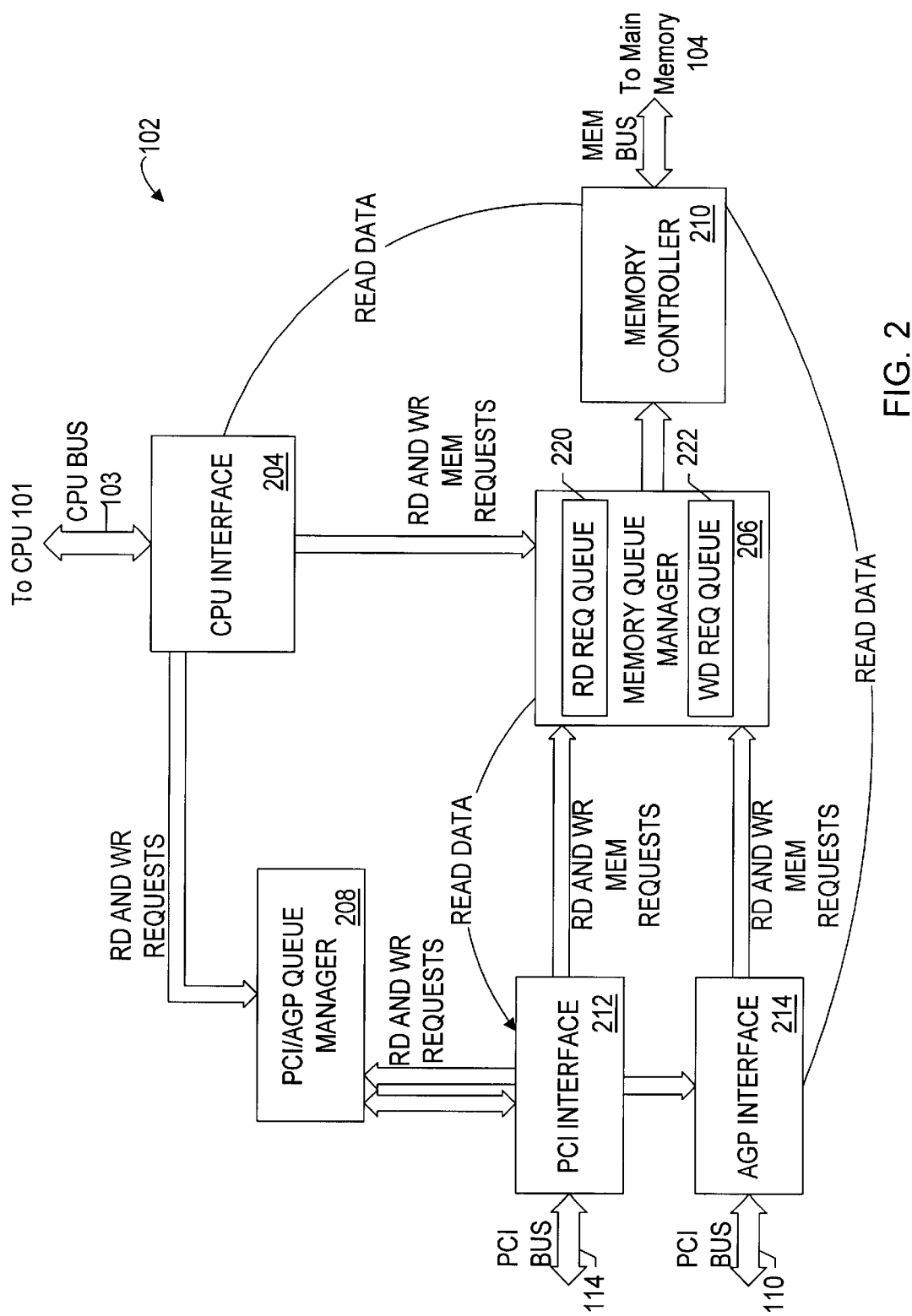
FIG. 2 is a block diagram of one embodiment of a bridge logic unit.

Turning next to FIG. 2, a block diagram of one embodiment of bridge logic unit 102 is shown. The depicted embodiment of bridge logic unit 102 includes a CPU interface 204 coupled to a memory queue manager 206 and a PCI/AGP queue manager 208 (also referred to as the NLM (non-local memory) manager). A memory controller 210, a PCI interface 212, and an AGP interface 214 are further shown coupled to memory queue manager 206. The illustrated components of bridge logic unit 102 may be embodied upon a single monolithic integrated circuit chip.

As will described in further detail below, all requests to main memory 104, both read and writes, are processed through memory queue manager 206. Memory queue manager 206 is configured to receive requests from each of the depicted interfaces, arbitrates between them, and appropriately loads each request into either a read request queue 220 or a write request queue 222. Requests from read request queue 220 and write request queue 222 are then provided to memory controller 210 which subsequently orchestrates the transfer of data to or from main memory 104. As illustrated, read data resulting from memory read requests may be returned directly to CPU interface 204 and AGP interface 214 from memory controller 210.

Non-local memory requests from CPU 101 to devices coupled to either PCI bus 114 or AGP bus 110, as well as requests between AGP bus 110 and PCI bus 114, are processed through PCI/AGP queue manager 208. Non-local memory requests include Interrupt Acknowledge, I/O cycles, configuration cycles, special cycles, and memory cycles to an address range outside of the main memory address range.

Generally speaking, bridge logic unit 102 is configured to disable write posting from either CPU bus 103 or PCI bus 114 in certain specific situations, and flushes posted write transactions before allowing certain read requests to be serviced. This advantageously insures that coherency in the system is maintained. More specifically, in one embodiment when a PCI device 112 performs a read to main memory 104, the bus bridge blocks CPU to PCI write posting and flushes any posted CPU to PCI transactions pending in the bridge. The bridge re-enables CPU to PCI posting once the CPU to PCI buffers have been flushed and the snoop phase of the snoop cycle corresponding to the memory read operation is complete. The bus bridge allows the read operation by the PCI device to complete after the pending CPU to PCI transactions have been flushed and read data from main memory is available. The bridge may be configured to add wait states instead of retrying the master once the CPU to PCI buffers are flushed and the snoop phase of the snoop cycle corresponding to the memory read operation completes if data is not yet available from memory. In a further embodiment, prior to performing a PCI read cycle on behalf of a read cycle initiated by CPU 101, bridge logic unit 102 determines whether there are any posted PCI to memory write transactions pending in a transient buffer of PCI interface 212. If there are pending PCI to memory transactions posted within the transient buffer of PCI interface 212, bridge logic unit 102 blocks any further PCI to memory transactions from being posted within the transient buffer of PCI interface 212, and flushes the pending PCI to memory transactions into memory queue manager 206 for storage of the data within main memory 104. Bridge logic unit 102 further causes the CPU to PCI read cycle on CPU bus 103 to be retried. When the transient buffer of PCI interface 212 is emptied, CPU interface 204 accepts the re-attempted CPU to PCI read transaction on CPU bus 103, and PCI interface 212 initiates a corresponding read cycle on PCI bus 114. Once the read cycle is initiated on PCI bus 114, posting of PCI to memory write transactions is re-enabled. Further details regarding this operation are provided further below in connection with FIGS. 8A, 8B, 9A and 9B.

Figure 3:
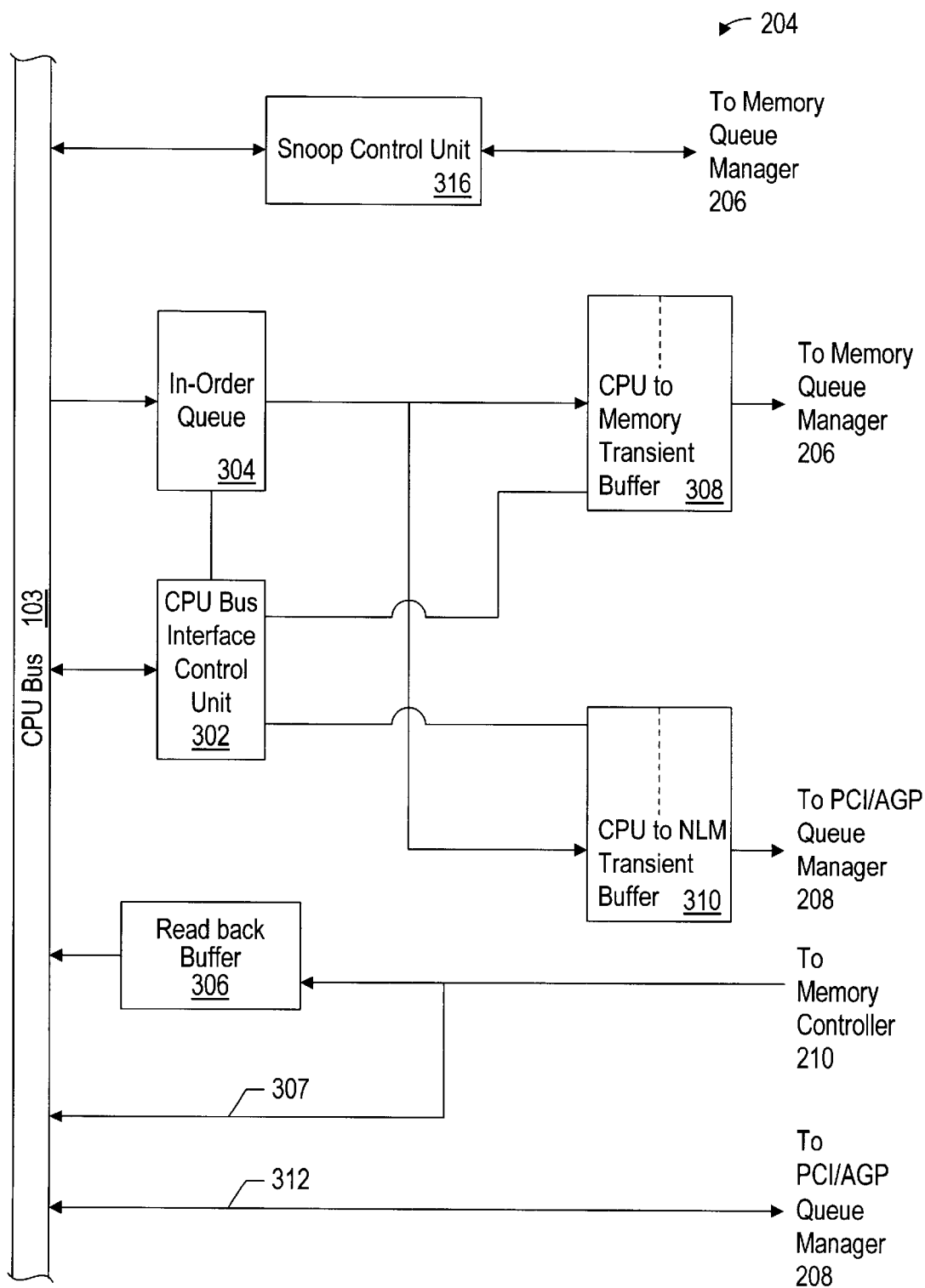
FIG. 3 is a block diagram of one implementation of a CPU interface.

A suitable implementation of the various blocks illustrated in FIG. 2 will next be discussed. Referring to FIG. 3, a block diagram is shown of one embodiment of CPU interface 204. Generally speaking, CPU interface 204 operates as a target with respect to various transactions effectuated by CPU 101. In the illustrated embodiment, CPU interface 204 includes a CPU bus interface control unit 302 coupled to an in-order queue 304 and to a read back buffer 306. A CPU to memory transient buffer 308 and a CPU to NLM transient buffer 310 are further illustratively coupled to CPU bus interface control unit 302.

CPU bus interface control unit 302 is provided to detect and track cycles being effectuated upon CPU bus 103. In one embodiment in which CPU 101 is a Pentium® Pro microprocessor, CPU bus interface control unit 302 includes separate state machines for request phase decoding, snoop tracking, response tracking and data tracking. Since the Pentium® Pro microprocessor allows multiple outstanding requests to be pipelined, CPU bus interface control unit 302 may be configured to track multiple cycles concurrently. In one embodiment, up to four CPU bus cycles may be simultaneously active.

As cycles are effectuated, requests from CPU 101 are loaded in order within in-order queue 304. These requests may comprise read or write requests for access to main memory 104, and read or write requests to non-local memory including I/O requests. It is noted that various other request types may further be accommodated, such as various special cycles including flush cycles, interrupt acknowledge cycles, etc. depending upon the specific microprocessor employed in the implementation and the system requirements. In one embodiment, up to four requests may be pending within in-order queue 304 (corresponding to the up to four outstanding transactions that may be pending on CPU bus 103). The removal or retiring of requests within in-order queue 304 is performed when a particular transaction is completed on CPU bus 103.

CPU bus interface control unit 302 is further configured to de-queue requests from in-order queue 304 and to decode the CPU cycles. CPU bus interface unit 302 determines if the CPU request is for access to main memory 104, the GART (Graphics Adapter Remap Table) region, AGP bus 110 or PCI bus 114. Furthermore, CPU bus interface control unit 302 may determine if the transaction can be accepted, posted, or if it has to be retried.

Several buffers may be incorporated within CPU interface 204. CPU to memory transient buffer 308 interfaces to memory queue manager 206, and in one implementation is two cache lines deep. CPU to non-local memory (NLM) transient buffer 310 interfaces to the PCI/AGP queue manager 208. In one implementation, CPU to NLM transient buffer 310 is also two cache lines deep. These buffers provide a simple mechanism for the CPU interface 204 to communicate to other modules of the bridge logic unit 102 for read, write and other miscellaneous requests.

CPU to memory transient buffer 308 provides an area where memory requests can be stored until they can be serviced by memory queue manager 206. Since CPU to memory transient buffer 308 may be two lines deep, memory queue manager 206 may read one location while another request is being loaded into the other location via in-order queue 304. The request information contained by CPU to memory transient buffer 308 includes a request address, request type information, and write data (for write requests only). In one embodiment, memory queue manager 206 extracts data 64-bits at a time from the data portions residing within CPU to memory transient buffer 308.

Various transactions from CPU 101 to either AGP bus 110 or PCI bus 114 (discussed further below) are communicated through CPU to NLM transient buffer 310 to PCI/AGP queue manager 208. In one implementation, all requests to the PCI/AGP queue manager 208 are quadword (i.e., 64-bits) based only. Cache line writes from CPU 101 occupy four locations in the data portions of the CPU to NLM transient buffer, but only one address. An individual request to the PCI/AGP queue manager 208 is generated for each of the quadwords, wherein the stored address is incremented by one after each request.

In one implementation, CPU to memory transient buffer 308 may always request a full cache line of data from main memory 104, even if the actual request is a single quadword read. On the other hand, the CPU to NLM transient buffer 310 only requests a quadword of data at a time.

A feedback path for data read from main memory 104 is provided through read back buffer 306. A bypass path 307 may further be provided to allow data to bypass the read back buffer 306 and be directly driven upon CPU bus 103. Furthermore, read data from PCI/AGP queue manager 208 is provided upon a path 312. The CPU bus interface control unit 302 may also be configured to speculatively prefetch sequential lines from main memory 104. This speculatively fetched information may be temporarily stored in read back buffer 306.

CPU interface 204 may configured such that certain write cycles are always posted, and such that other cycles are never posted. Similarly, certain types of read cycles may result in snoop stalls, while others will not. For example, in one implementation I/O cycles are never posted, while memory cycles to main memory 104 as well as to non-local memory are always posted. I/O reads and non-local memory reads may result in snoop stalls until data is ready since the cycle may need to be retried under certain circumstances, as discussed further below. On the other hand, reads to main memory may not result in snoop stalls; rather, CPU bus interface control unit 302 may simply withhold assertion of the DRDY signal until the requested data is available in read back buffer 306. It is noted that CPU to memory transient buffer 308 and CPU to NLM transient buffer 310 function as a write posting buffer to allow address and data from CPU 101 to be accumulated until the appropriate queue manager can service the requests, and also function as read request buffers where multiple read cycles can be outstanding.

A snoop control unit 316 is finally illustrated within CPU interface 204. Snoop control unit 316 is configured to generate snoop transactions on CPU bus 103 to insure memory coherency during PCI cycles to main memory 104. In certain situations where a writeback of modified data from CPU 101 (or an external cache unit) occurs, snoop control unit 316 may merge the line of writeback data with the write data to memory from the PCI bus 114. Writeback data may further be snarfed in response to a PCI memory read operation to allow the writeback data to be directly provided to PCI bus 114 through PCI interface 216.

Figure 4A:
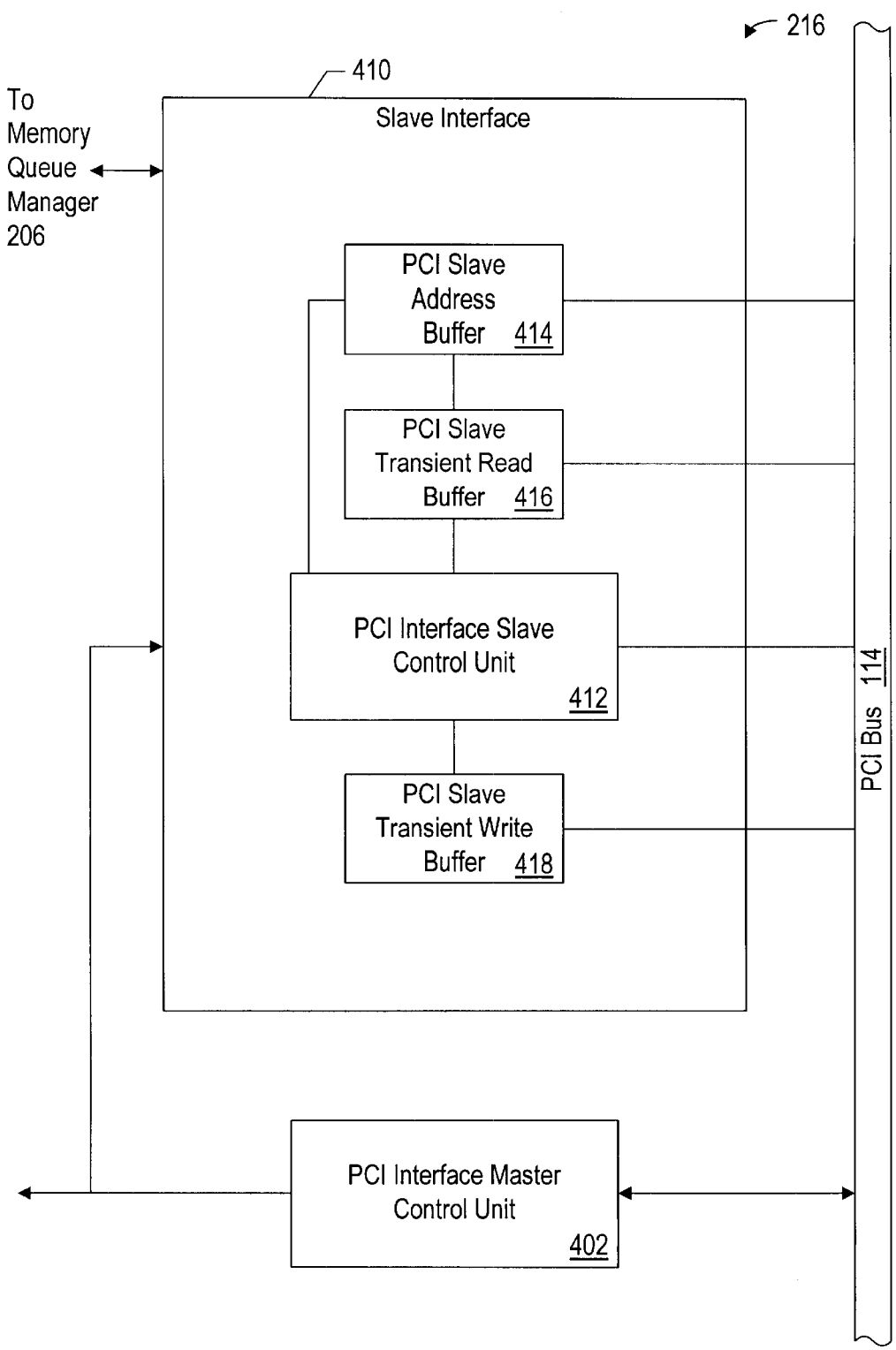
FIG. 4A is a block diagram illustrating aspects of a suitable embodiment of a PCI interface.

Turning next to FIG. 4A, a block diagram illustrating aspects of one suitable embodiment of PCI interface 216 is shown. PCI interface 216 generally includes a PCI interface master control unit 402 coupled between PCI bus 114 and PCI/AGP queue manager 208. PCI interface master control unit 402 is configured to initiate transactions on PCI bus 114 on behalf of CPU initiated transactions or AGP write transactions targeted to PCI bus 114. As stated previously, CPU and AGP initiated transactions targeted to PCI bus 114 communicate to the PCI interface 216 through PCI/AGP queue manager 208. When a request to read or write data to PCI bus 114 is received by PCI interface master control unit 402, PCI interface master control unit 402 arbitrates for the PCI bus 114 and initiates a transaction on PCI bus 114. Address, byte enable, transaction type description, and data (for write transactions) are passed from the PCI/AGP queue manager 208 to the PCI interface master control unit 402 to accommodate effectuation of the proper cycle on PCI bus 114.

The transfer of requests from PCI/AGP queue manager 208 to PCI interface 216 may be based on quadword transfers. Cache line transfers are transferred as four separate quadwords. Byte enables are further passed to the PCI interface master control unit 402 and are utilized to ultimately decide the size of a data transfer on PCI bus 114. PCI interface master control unit 402 may multiplex either the lower or upper four byte enables to PCI bus 114 depending on the asserted byte enables. If all the byte enables are asserted, PCI interface master control unit 402 may convert the quadword transfer into a burst of two doublewords on PCI bus 114 (since the PCI bus has a data width of 32-bits). If either the four upper or four lower byte enables are deasserted, the PCI interface master control unit 402 may drive the request from PCI/AGP queue manager 208 as a single doubleword transfer on PCI bus 114. It is noted that PCI interface master control unit 402 may further support write combining of sequential write data from the CPU bus 103.

PCI/AGP queue manager 208 and PCI interface master control unit 402 may employ a simple request/acknowledge protocol to control the flow of transactions between the two interfaces. Separate request and acknowledge signals may further be employed to control the transfer of data between the AGP interface 214 and PCI interface 216.

Figure 4B:
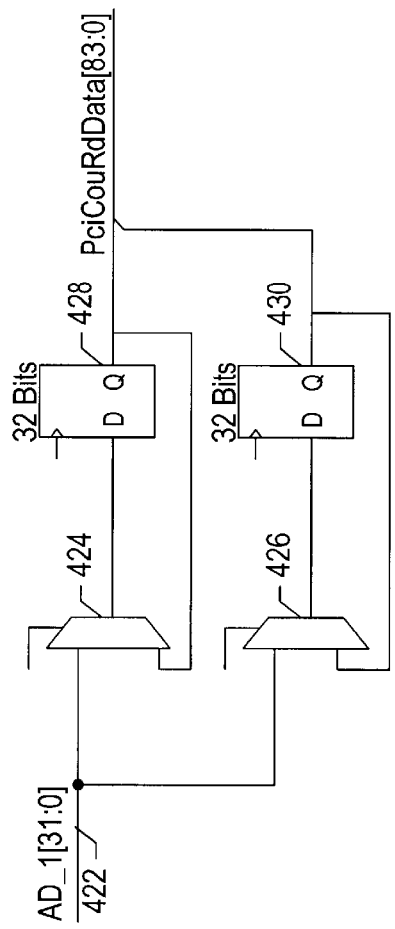
FIG. 4B is a block diagram of an implementation of a PCI master transient read buffer employed within a PCI interface master control unit.

FIG. 4B is a block diagram of an implementation of a PCI master transient read buffer employed within PCI interface master control unit 402. As illustrated, read data from the multiplexed address/data lines 422 of PCI bus 114 are provided to a pair of multiplexers 424 and 426. Depending upon the 64-bit quadword to which the read data aligns, the data is stored on a given clock within either flip-flop 428 or 430. In this manner, 32-bit doubleword information from PCI bus 114 is quadword aligned for receipt by CPU interface 204.

Figure 4C:
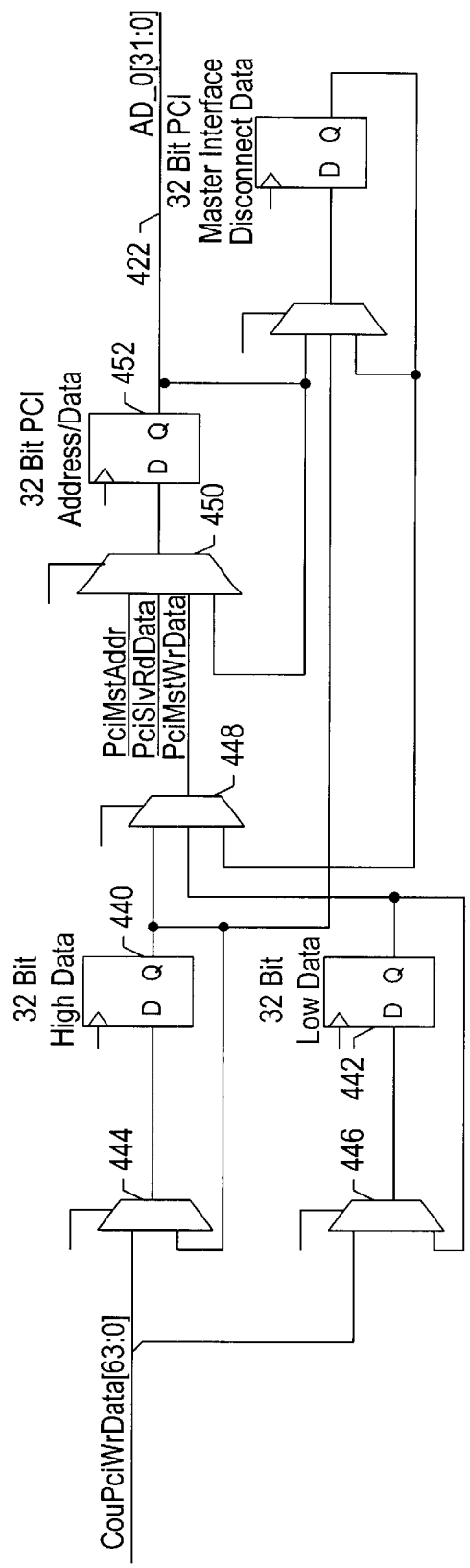
FIG. 4C is a block diagram of an implementation of a PCI master transient write buffer employed within a PCI interface master control unit.

FIG. 4C illustrates a block diagram of an implementation of a PCI master transient write buffer which may be employed within PCI interface master control unit 402. Similar to the PCI master transient read buffer, the PCI master transient write buffer of FIG. 4C selects either the upper doubleword or the lower doubleword of write data from PCI/AGP queue manager 208 to be driven upon the multiplexed address/data lines 422 of PCI bus 114. In the depicted implementation, 64-bit data is stored on a given clock within flip-flops 440 and 442 through multiplexers 444 and 446, respectively. The appropriate doubleword of data being written is then selected through multiplexer 448 and through multiplexer 450 to be driven upon PCI bus 114 through flip-flop 452. It is noted that address information may be selected through multiplexer 450 to be driven on the multiplexed address/data lines 422 of PCI bus 114 during the address phases of PCI transactions, and that read data, when PCI interface 216 is operating as a slave, may similarly be selected through multiplexer 450 during slave-mode read cycles, as discussed further below.

Turning back to FIG. 4A, PCI interface 216 further includes a slave interface 410 which accepts transactions targeted for main memory 104, the PCI configuration address base within bus bridge unit 102, memory writes targeted toward AGP bus 110, and cycles to the memory mapped AGP control registers. Slave interface 410 illustratively includes a PCI interface control unit 412 coupled to a PCI slave address buffer 414, a PCI slave transient read buffer 416, and a PCI slave transient write buffer 418.

When the FRAME_signal is asserted on PCI bus 114, indicating the start of a PCI transaction, the address of the transaction is stored within PCI slave address buffer 414. PCI interface slave control unit 412 further receives command information from PCI bus 114 indicating the type of cycle being effectuated. The PCI interface slave control unit 412 is configured to decode the command and address information to determine if the transaction is targeted to bus bridge unit 102 and, asserts the DEVSEL_signal to claim the cycle, when appropriate. As each address is stored in PCI slave buffers 414, the PCI address will be decoded to determine whether graphics address translation is required. If the PCI address is within the bounds of the virtual graphics address range defined by the GART (Graphics Adapter Remap Table) mechanism (not shown), the PCI slave interface 410 indicates to the memory queue manager 206 that address translation is required for this request based on an entry in the graphics adapter remap table in main memory 104.

If the PCI transaction is targeted for main memory 104, slave interface 410 will either provide data for read transactions, begin accepting data for write transactions, or retry the PCI bus transaction. For PCI memory read transactions, the PCI slave interface performs PCI "delayed read" transactions. During a PCI delayed read transaction, the slave interface 410 requests the read data by providing a request to memory queue manager 206 and retries (e.g., through the PCI STOP_signal) the PCI read transaction until data has been returned from memory queue manager 206. For PCI memory write transactions, data is accepted into the PCI slave transient write buffer 418 once the PCI transaction has been positively decoded. A corresponding request including the valid PCI write data is subsequently provided to the memory queue manager 206 when either a full cache line has been accepted into the PCI slave transient write buffer 418 or the PCI bus transaction ends. PCI interface slave control unit 412 may additionally provide a snoop request to memory queue manager 206 with each PCI master access to a new cache line in main memory 104. This snoop request is asserted to maintain cache coherency.

Figure 4D:
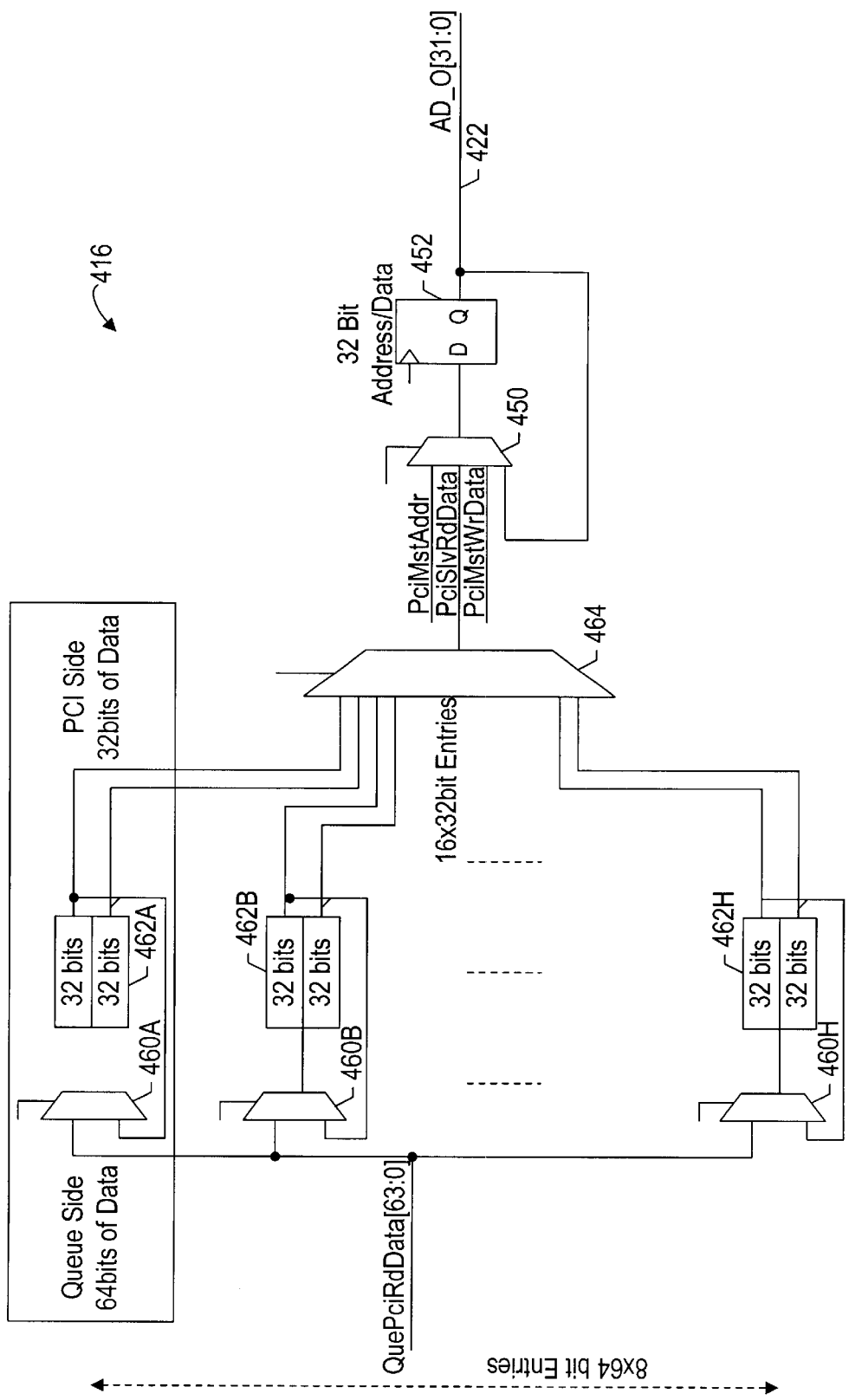
FIG. 4D is a diagram illustrating aspects of an exemplary implementation of a PCI slave transient read buffer.

Turning next to FIG. 4D, a diagram illustrating aspects of an exemplary implementation of PCI slave transient read buffer 416 is shown. For the implementation of FIG. 4D, PCI slave transient read buffer 416 includes a 16-by-32 bit read buffer for accepting up to two cache lines of read data requested by a PCI master. The read buffer is used to accept valid data from memory queue manager 206 which is sourced from either data fetched from main memory 104 or from CPU writeback data that resulted from a snoop hit to a dirty cache line. If a PCI master requests data from main memory 104 and it is determined that a modified line resides in the cache memory upon effectuation of a snoop transaction upon CPU bus 103, the memory queue manager 206 may return data from the CPU writeback transaction before the writeback data is written to main memory 104. If a PCI master requests data from main memory 104 and the cache line is clean, memory queue manager 206 returns data fetched from main memory 104. In one implementation, an entire cache line of data is always requested from memory queue manager 206 regardless of the PCI read command type (i.e., memory read, memory read multiple, or memory read line).

As illustrated by FIG. 4D, PCI slave transient read buffer 416 aligns read data with a cache line boundary. This alignment is supported by a set of multiplexers 460A–460H. Therefore, data is always returned from memory in a linear fashion and will update eight entries in PCI slave transient read buffer 416. As quadwords are provided from memory queue manager 206, they are routed through multiplexers 460A–460H to a corresponding pair of 32-bit registers (i.e., register pairs 462A–462H) which correspond to respective quadword positions in a given pair of lines. Since there are a total of sixteen 32-bit storage registers within the transient read buffer, up to two cache lines of read data may be stored. This advantageously allows PCI interface slave control unit 412 to prefetch data in anticipation of a PCI master crossing a cache line boundary, while providing data from a current line to PCI bus 114. It is noted that selected 32-bit data from one of register pairs 462A–462H requested during a particular PCI read transaction may be selected and provided through a multiplexer 464 and passed through multiplexer 450 and flip-flop 452 to the multiplexed address/data lines 422 of PCI bus 114.

Referring back to FIG. 4A, when a PCI memory read is targeted for main memory 104, PCI interface slave control unit 412 checks the contents of PCI slave transient read buffer 416 for valid read data. If valid read data corresponding to the request exists in PCI slave transient read buffer 466, the data is provided to PCI bus 114 during the data phase of the PCI transaction. If valid read data does not exist in PCI slave transient read buffer 416, PCI interface slave control unit 412 normally causes the PCI memory read transaction to be retried (e.g., using the PCI STOP_signal). PCI interface slave control unit 412 further requests a cache line containing the read data from memory queue manager 206 if a read request (either speculatively generated or from a previously retried (delayed) transaction) is not already outstanding within the memory queue manager 206. Subsequent attempts to read the same data by the PCI master will again result in PCI interface slave control unit 412 to retry the transaction if the data is still not available in the PCI slave transient read buffer 416 (or instead if the snoop phase of the snoop cycle corresponding to the pending delayed read cycle is not yet complete, as discussed below). If the PCI master reinitiates the read request and the read data has been stored in PCI slave transient read buffer 416, the data is provided during that PCI read cycle.

PCI interface slave control unit 412 may be configured such that it does not retry the PCI master if the read cycle matches a pending delayed read cycle and the snoop phase of the snoop cycle is over. Instead, during this condition the PCI slave negates TRDY until the requested data is available. The master may also hold in wait states during a burst read transfer that spans several cache lines if the snoop phase of the snoop cycle of a speculative read request is over. This may advantageously minimize arbitration latencies and optimize back to back cache line reads.

In addition, PCI interface slave control unit 412 may not support multiple delayed read transactions concurrently. In such an embodiment, any attempt by a second PCI master to read from main memory while a delayed read transaction is pending will be retried until the first PCI master reinitiates its read transaction and completes at least one data transfer. If the first PCI master reinitiates its read transaction and leaves the data in the PCI slave transient read buffer 416, the remaining data is marked speculative by PCI interface slave control unit 412. PCI interface slave control unit 412 asserts a snoop request coincident with each cache line read request to the memory queue manager 206 to maintain cache coherency. Once the requested read data is returned from the memory queue manager 206, a request corresponding to a previously retried (delayed) read transaction is accepted and read data is provided to the PCI master.

PCI interface slave control unit 412 may still further be configured to control the prefetching of data from main memory 104. In one specific implementation, when a PCI memory read line command or a PCI memory read multiple command is targeted for main memory 104, the PCI interface slave control unit 412 immediately requests two cache lines of data from main memory 104 through memory queue manager 206. In anticipation of the PCI master reading multiple cache lines of data, PCI interface slave control unit 412 performs additional speculative read requests as space becomes available in PCI slave transient read buffer 416. By prefetching data from main memory 104, slave interface 410 can advantageously overlap a read request to memory queue manager 206 with data transfers on PCI bus 114 to achieve higher data transfer performance.

Speculative read data is sequential data in PCI slave transient read buffer 416 which was requested purely in anticipation of the PCI master reading the next sequential memory address. When a PCI master terminates a transaction without reading all of the sequential data in PCI slave transient read buffer 416, the remaining data is marked as residual speculative read data. The remaining data in the PCI slave transient read buffer 416 may not be marked as residual speculative data if the master, during the last read transfer, did not have all of the byte enables set. The residual speculative data is invalidated in the PCI slave transient read buffer 416 in response to various conditions. For example, residual speculative data may be invalidated if a PCI master memory read line or multiple transaction is attempted to a non-sequential memory address, a PCI memory read (normal) transaction is attempted to main memory, a CPU to PCI write transaction is detected (since a CPU to PCI write transaction is considered to be a synchronization event) or upon a PCI to memory write that hits within the two cache line address space where speculative data resides. In addition, data residing in PCI slave transient read buffer 416 may be marked invalid due to lapse of a discard counter employed to discard delayed read data (being held in PCI slave transient read buffer 416) in the event the master has not repeated a previously retried request establishing the delayed read within a predetermined period of time, as controlled by the discard counter.

PCI slave transient write buffer 418 of slave interface 410 allows for the posting of up to two cache lines of write data from a PCI master. By providing up to two cache lines of write data buffering, slave interface 410 may advantageously overlap the acceptance of write data from PCI bus 114 with data transfers to memory queue manager 206 or to the PCI/AGP queue manager 208. When valid write data is present on PCI bus 114 (i.e., IRDY is asserted), the data and byte enables are accepted into PCI slave transient write buffer 418.

PCI slave transient write buffer 418 operates in either a memory queue manager mode or in an NLM mode. In the memory queue manager mode, PCI interface slave control unit 412 may transfer data to the memory queue manager 206 one cache line at a time regardless of whether the PCI bus transfer size is one byte or one cache line. The byte enables for bytes not transferred on PCI bus 114 are deasserted when passed to the memory queue manager 206. Once a cache line in PCI slave transient write buffer 418 is full, or as soon as the PCI master is finished with the write transfer to memory, a valid write data request and byte enables are provided to memory queue manager 206.

In the NLM mode, PCI slave transient write buffer 418 transfers data to the PCI/AGP queue manager 208 one quadword at a time. Once a cache line in the PCI slave transient write buffer 418 is full, or as soon as the PCI master is finished with its write transfer (e.g., to the AGP bus 110), the request in the PCI slave transient write buffer 418 is transferred to PCI/AGP queue manager 208. The transfer of cache lines to the PCI/AGP queue manager 208 may be optimized by notifying the PCI/AGP queue manager 208 that PCI interface 216 is performing cache line writes. In the cache line mode, the PCI/AGP queue manager 208 parks on the PCI slave interface 410 until the cache line is fully transferred.

When a PCI memory write is targeted for main memory 104, slave interface 410 immediately begins accepting write data from PCI bus 114. Slave interface 410 posts data from PCI bus 114 into PCI slave transient write buffer 418 with the assertion of DEVSEL_. Slave interface 410 may additionally support the posting of sequential burst writes into PCI slave transient write buffer 418 at zero wait states.

A write request may be asserted to the memory queue manager 206 by slave interface 410 when the PCI write transaction is initially positively decoded and when the PCI master writes to a new cache line during a burst transaction indicating that the PCI address should be snooped. The memory queue manager 206 ensures that all snooping has been completed and that any modified data in the memory write data queue, CPU to memory transient buffer, or the CPU cache is written to main memory before PCI write data is written to main memory. Data merging may be employed in situations where writeback data is provided from cache memory.

When a PCI memory write and invalidate command is targeted for main memory 104, the PCI slave interface 410 treats the command similar to the PCI memory write command; however, PCI interface slave control unit 412 may be configured to provide a writeback and invalidate indication to memory queue manager 206 coincident with the write request. The CPU interface 204 and memory queue manager 206 can then use this condition to ignore the writeback data from CPU 101 on a hit to a dirty cache line.

Finally, PCI interface slave control unit 412 may be configured to provide a control signal to CPU interface 204 through PCI/AGP queue manager 208 to enable or disable CPU to PCI write posting. This control signal may advantageously allow the PCI interface 216 to prevent data coherency and latency problems. In one suitable implementation, CPU to PCI write posting (in CPU to NLM transient buffer 310) is disabled when a PCI master establishes a delayed read from main memory, and remains disabled until the snoop phase of the snoop cycle completes on CPU bus 103 and the CPU to PCI posting buffer is sampled empty. Write posting may further be disabled when the flush request signal FLSHREQ_ is asserted on PCI bus 114.

Referring back to FIG. 2, memory controller 210 is next considered in further detail. Memory controller 210 is configured to process requests received from memory queue manager 206 and to correspondingly access locations within main memory 104. In one embodiment, memory controller 210 supports synchronous DRAM, and is preferably implemented as a non-interleaved, non-parity, non-ECC memory controller. The memory controller timing may be programmable and may support address pipelining. Furthermore, the memory controller 210 may support multiple physical banks of memory. Memory controller 210 may also be configured to support a variety of additional functions, such as paging support and refresh, as desired.

Memory controller 210 services requests from memory queue manager 206 via read request queue 220 and write request queue 222. For a write request, memory controller 210 takes data from a designated write request queue entry (e.g., the entry at the "head of queue") and generates an associated access to main memory 104. For a read request, memory controller 210 retrieves data from main memory 104 and provides it for transfer to the requesting interface.

In one embodiment, memory controller 210 services requests pending within read request queue 220 and does not service requests in write request queue 222 until a predetermined plurality of write requests have become pending within write request queue 222. Specifically, memory queue manager 206 may be configured to generate a control signal referred to as WrReqAlmostFull which, when asserted, indicates that the write request queue 222 is nearly full. When this control signal is not asserted, memory controller 210 services requests from only read request queue 220, thereby providing a higher priority for read requests. When the WrReqAlmostFull signal is asserted, memory controller 210 begins to toggle between servicing a request (or multiple requests) from the read request queue 220 and then a request (or multiple requests) from write request queue 222 in a ping-pong fashion until the WrReqAlmostFull signal is deasserted. In this manner, write requests are serviced to allow write request queue 222 to receive additional memory write requests. In one embodiment, the WrReqAlmostFull signal is asserted when five pending requests reside in write request queue 222.

Figure 5:
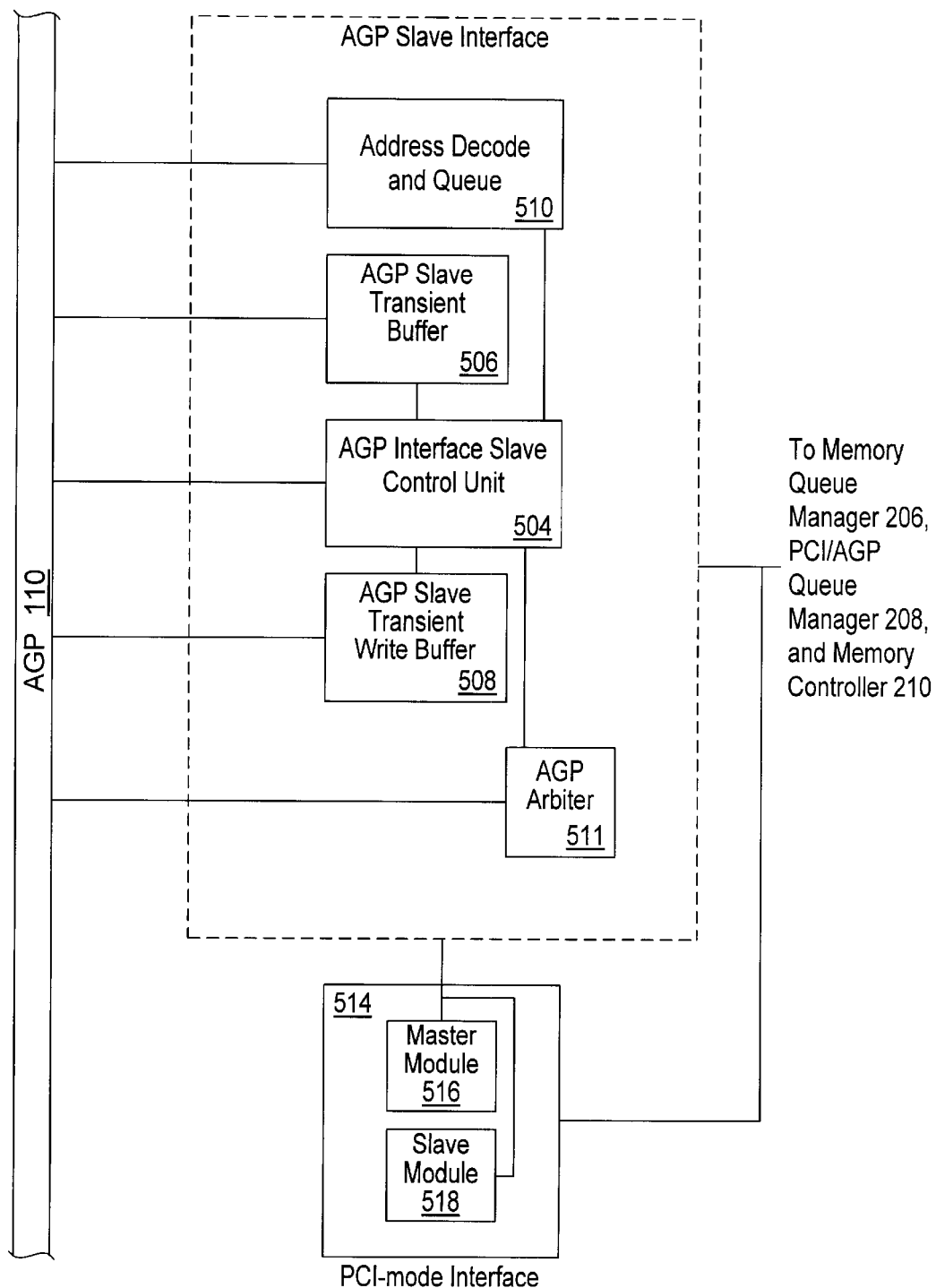
FIG. 5 is a block diagram of one embodiment of an AGP interface.

Aspects relating to one embodiment of AGP interface 214 will next be discussed in conjunction with FIG. 5. In the depicted embodiment, AGP interface 214 is configured to provide an external interface to a 66-Mhz 32-bit AGP/PCI bus. Internally, AGP interface 214 interfaces to memory queue manager 206, memory controller 210 and PCI/AGP queue manager 208. AGP interface 214 may be configured to support both AGP protocol transactions as well as PCI-protocol transactions (e.g., 66 Mhz PCI type transactions).

As illustrated, AGP interface 214 includes an AGP slave interface 502 having an AGP interface slave control unit 504 coupled to an AGP slave transient read buffer 506, an AGP slave transient write buffer 508, an address decode and queue unit 510, and an AGP arbiter 511. AGP interface 214 further includes a PCI-mode interface 514 illustratively comprising a master module 516 and a slave module 518.

Since in the illustrated embodiment, AGP bus 110 is a shared resource for both PCI protocol transactions and AGP protocol transactions, AGP arbiter 511 is provided to support the shared use of the bus by both protocols. Specifically, AGP arbiter 511 arbitrates between agents requesting to perform PCI-mode transactions on AGP bus 110 and agents requesting AGP protocol transactions. PCI-mode interface 514 is configured to support both master and slave functionality for PCI transactions on AGP bus 110, and can be configured similar to the PCI interface 216 discussed above in conjunction with FIGS. 4A–4D. Like PCI interface 216, PCI-mode interface 514 may be configured to pass memory requests to memory queue manager 206 and NLM requests to PCI/AGP queue manager 208. In addition, the PCI mode master interface runs cycles on the PCI/AGP on behalf of PCI write transactions targeted to the PCI/AGP bus.

For AGP transactions, when an AGP request is asserted on AGP bus 110, the address, command type and transfer length is received by slave interface 502 via address decode and queue unit 510. As additional requests are initiated by an external AGP master, each request is stacked up behind the previous request in the AGP slave address decode and queue unit 510. It is noted that when multiple requests are stacked up in the address decode and queue unit 510, the AGP requests may be retired out of order.

An AGP write request is retired as the data is accepted into the AGP transient write buffer 508. AGP read requests are retired when read data is provided to the AGP bus 110 from the AGP transient read buffer 506. In one embodiment, a total of up to four pending requests may reside in address decode and queue 510. It is contemplated however, that differing numbers of requests may be queued within slave interface 602, as desired.

As each address is stored in slave interface 502, the AGP address will be decoded to determine whether graphics address translation is required. If the AGP address is within the bounds of the virtual graphics address range defined by the GART (Graphics Adapter Remap Table) mechanism (not shown), the AGP slave interface 502 indicates to the memory queue manager 206 that address translation is required for this request based on an entry in the graphics adapter remap table in main memory 104. It is noted that entries of the graphics adapter remap table may be cached within a separate GART cache module (also not shown) residing within bridge logic unit 102.

As will be described in further detail below, while requests from AGP slave interface 502 are not snooped on CPU bus 106 (since the cycles are non-cachable), memory queue manager 206 may be configured to snoop all AGP read requests in write request queue 222 to main memory 104. This insures that an AGP read request will be coherent with a previously issued AGP write request to the same address, where write data is still present in the write request queue 222. If an AGP read request hits an address present in the write request queue 222, memory queue manager 206 flushes the write request queue 222 to main memory 104 until the snoop hit condition is no longer present before issuing the read request to main memory 104.

In one embodiment, AGP slave transient read buffer 506 includes a 32-by-32 bit transient read buffer for accepting up to four cache lines of read data from main memory 104 requested by an AGP master. Slave interface 502 requests read data from memory queue manager 206 in multiples of four, eight, twelve or sixteen quadwords (i.e., 1, 2, 3 or 4 cache lines) based on the AGP requested address and transfer length. By providing up to four cache lines of read data, the AGP slave interface can overlap AGP read requests to the memory queue manager 206 with read data transfers on AGP bus 110.

Similarly, in one embodiment AGP slave transient write buffer 508 comprises a 32-by-32 bit transient write buffer for posting up to four cache lines of write data from an AGP master. By providing up to four cache lines of write data buffering, the AGP slave interface 502 can overlap the acceptance of write data from an AGP master with write data transfers to the memory queue manager 206. When valid write data is present on the AGP bus 110, the data and byte enables are accepted into AGP slave transient write buffer 508. AGP interface slave control unit 504 analyzes the amount of data stored in the AGP slave transient write buffer 508 to determine the transfer size to memory queue manager 206. Data is transferred to the memory queue manager 206 in multiples of four or eight quadwords (one or two cache lines) based on the AGP address and transfer length.

Figure 6A:
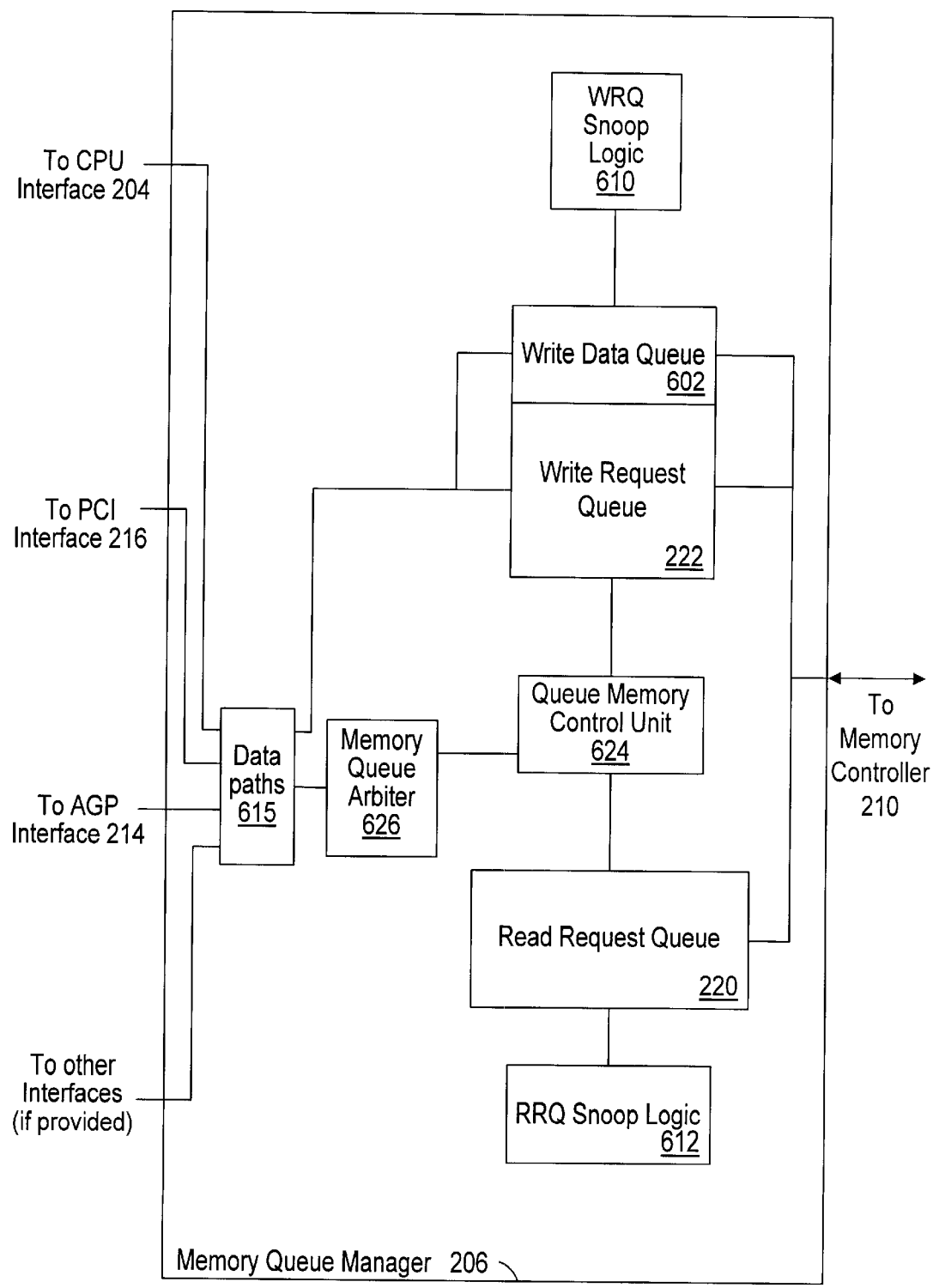
FIG. 6A is a block diagram of one embodiment of a memory queue manager.

Turning next to FIG. 6A, aspects of one suitable embodiment of memory queue manager 206 are next considered. As stated previously, read memory requests from CPU interface 204, PCI interface 216, and AGP interface 214 are loaded into read request queue 220, while memory write requests are loaded into write request queue 222. Corresponding write data is stored within a write data queue 602. The loading of read requests and write requests as well as various other functionality, as desired, is supported by control logic depicted generally as queue memory control unit 624. Various data paths 615 are provided between the request queues and the depicted device interfaces to accommodate the routing of requests. As will be described in further detail below, a memory queue arbiter 626 is further provided within queue memory manager 206 to arbitrate between pending requests of CPU interface 204, PCI interface 216 and AGP interface 214. A write request queue (WRQ) snoop logic unit 610 and a read request queue (RRQ) snoop logic unit 612 are further provided to maintain coherency, as will also be discussed further below.

In one specific implementation, write request queue 222 is configured to store up to eight write requests concurrently. Each write request corresponds to four quadwords (i.e., one cache line) of write data. Separate portions of each of the eight locations of write request queue 222 may be provided to store chip selects, bank selects and row addresses, and column addresses. By partitioning each request location of write request queue 222 in this manner, memory controller 210 may advantageously de-queue portions as it requires them. To facilitate snooping, in one implementation, write request queue 222 is implemented as a register bank.

Figure 6B:
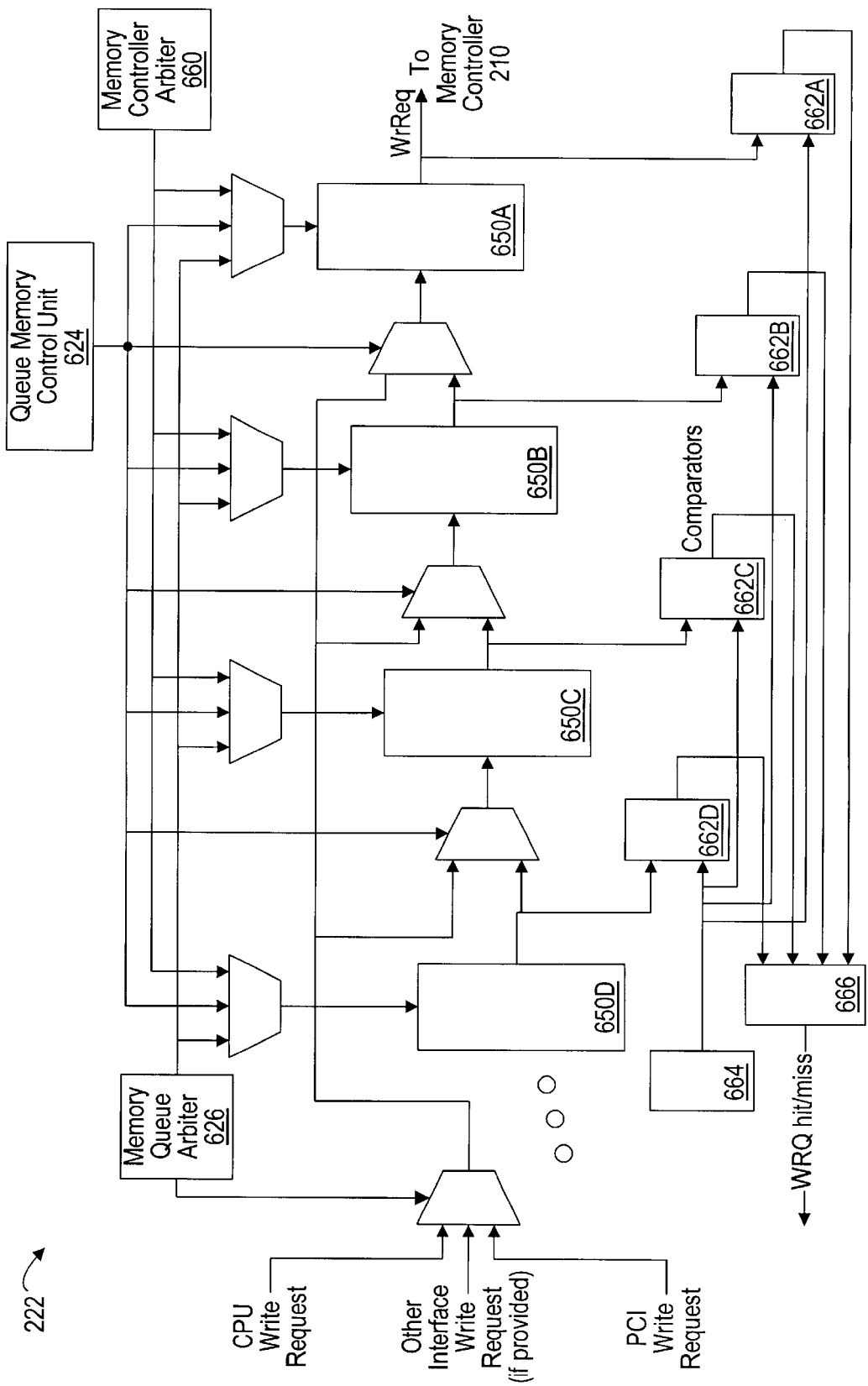
FIG. 6B is a diagram illustrating various aspects associated with an exemplary implementation of a write request queue, along with related aspects of a write request queue snoop logic unit.

FIG. 6B illustrates various aspects associated with an exemplary implementation of write request queue 222, along with related aspects of a write request queue snoop logic 610. Write request queue 222 is shown with a plurality of registers 650A–650D illustrative of various storage locations comprised within write request queue 222. As noted previously, in one implementation, a total of eight such storage locations may be provided, although only four are included in the illustration for simplicity. In this implementation, as a request at the head of the queue (i.e., residing in register 750A) is serviced by memory controller 210, the remaining requests in the other registers are shifted one position to the right such that a new request will appear at the head of the queue formed by register 750A. Memory queue arbiter 626 arbitrates between pending requests in the various bridge interfaces and determines the next available storage register in which the write request may be placed. As illustrated in the drawing, memory queue arbiter 626 may select either a CPU write request from CPU interface 101 or a PCI write request from PCI interface 216 for loading into a register of the write request queue 222 forming the current tail of queue. Memory queue arbiter 626 may further select from requests from other interfaces, such as AGP interface 214 and others, such as a USB bus or an IEEE 1394 bus, if provided. Advancement of the requests from the tail of the queue to the head of the queue is controlled by portions of the functionality of queue memory control unit 624. Finally, the de-queueing of requests from the head of the queue is controlled by a memory arbiter 660.

FIG. 6B finally illustrates various aspects relating to a suitable implementation of portions of the write request queue snoop logic unit 610. As illustrated in FIG. 7B, a plurality of comparators 662A–662D are provided to compare the address of each valid request residing in registers 650A–650D with the address of a new read request which is provided to a register or port 664. Logic unit 666 generates a signal indicating whether there is a hit in any of the write request queue locations. Further aspects regarding the snooping operations associated with memory queue manager 206 will be discussed in further detail below.

As stated previously, memory controller 210 normally services read requests pending within read request queue 220 with a higher priority than write request pending within write request queue 222. Referring collectively to FIGS. 6A and 6B, as long as the number of pending write requests within write request queue 222 is below a threshold number, memory arbiter 660 will cause memory controller 210 to select only read requests from read request queue 220. When the number of write requests pending in the write request queue 222 reaches a threshold number, write request queue 222 asserts the write request almost full signal (WrReqAlmostFull) to indicate that memory controller 210 should start servicing write requests. From that point, requests are serviced from both the write request queue 222 and read request queue 220 in a ping pong fashion until the write request almost full signal is deasserted.

Write data queue 602 stores data associated with each write request. In one implementation, write data queue 602 can store up to eight caches lines of write data and byte enables. It is noted that data may be stored in the write data queue 602 in a specific burst order (such as that of CPU 101) to thereby optimize performance.

In one implementation, read request queue 220 is configured to store up to four pending read requests from the various interfaces of the bus bridge. It is contemplated, however, that read request queue 222 could be configured to store alternative numbers of pending requests depending upon the number of overall interfaces serviced by the memory queue manager 206 and upon performance requirements. It is noted that like the write request queue 222, the request storage locations of read request queue 220 may be split into several sections, one for chip selects, another for bank selects and row addresses, and the other for column addresses, request sizes and read destinations to allow memory controller 210 to selectively extract only a portion of a particular request as it needs the information. The destination information may be used by the memory controller to determine whether to send data back through the memory queue manager 206 (for transactions requiring snooping), or to send the read data directly to the requesting device (for non-snooping transactions). The physical structure of read requests queue 220 may be similar to that of write request queue 222 illustrated in FIG. 6B.

It is additionally noted that one or more read holding buffers may be included within queue memory manager 206 to hold read data from memory destined to a snooping interface while the CPU snoop is effectuated. This allows a temporary location for read data from main memory 104 to reside until it is determined whether a snoop write back occurs, in which case the writeback data is sent to the requesting interface. It also allows a temporary location for writeback data which arrives before it can be delivered.

In one implementation, memory queue arbiter 626 receives a single request from each connected interface. It is noted that in one embodiment, AGP interface 214 may be treated as two separate interfaces for arbitration purposes, one for certain AGP mode requests and one for PCI mode requests. The request received from each interface may be a read request, a write request, or some other request type, such as an unlock request associated with certain locked transactions, among others. Certain special requests may not be queued within either read request queue 220 or write request queue 222, depending upon the nature of the request. For example, lock and unlock requests may not be provided to the queues. In addition, some requests may only be available from certain interfaces. It is further noted that high priority AGP read requests, as well as requests to read the GART table from main memory 104, may be treated by memory queue manager 206 and memory controller 210 with a higher priority than all other incoming requests. To facilitate these high priority AGP related requests, additional arbitration and queueing mechanisms may be provided to arbitrate the high priority requests and queue the high priority requests for servicing by memory controller 210. These mechanisms may be implemented substantially independent of the depicted portions of memory queue manager 206.

Requests are recognized by memory queue arbiter 626 and loaded into the appropriate request queue (i.e., either read request queue 220 or write request queue 222) as long as there are empty slots in the queues. When all of a particular request queue's slots are filled, the requests are left pending and the interfaces cannot issue more requests before their current ones are acknowledged.

Memory queue arbiter 626 implements a round-robin priority scheme to allow fair access to memory for all interfaces. To implement the round-robin priority scheme, memory queue arbiter 626 maintains a priority ranking to determine which devices gets serviced next, provided there are multiple requests pending. If there is only one request pending among the devices, that request is serviced immediately. When multiple requests are pending, they are serviced based on their priority rankings. The priority ranking is updated as long as a request is loaded into a request queue and an acknowledge is asserted to the requesting device. When there are no requests pending, the memory queue arbiter 626 parks at the CPU interface 204 to reduce the latency of initial CPU read cycles and resets the priority scheme. In some circumstances, memory queue arbiter 226 may select the CPU interface 204 or GART interface (not shown) out of order temporarily to handle snooping or AGP related address translation. Such out of order arbitration does not affect the saved priority rankings. Memory queue arbiter 626 controls multiplexed data paths depicted generally as block 615 which control which interface is connected to provide a memory request to a given queue. Once an interface is selected, logic embodied in queue memory control unit 624 controls snooping and queue loading.

Since in one implementation each interface coupled to queue memory manager 206 can present only a single request to the queue memory manager 206 at a time, and since memory queue arbiter 226 implements a fairness algorithm such as round-robin to arbitrate among the requests, addition interfaces may easily be incorporated such as interfaces for a USB (Universal Serial Bus) and/or an IEEE 1394 (FireWire) bus, among others, without significantly changing the design. Importantly, devices on such added buses as well as devices on the PCI bus 114 and AGP bus 110, both isochronous and asynchronous, are provided fair access to main memory 104.

Various aspects regarding the snooping of requests pending within read request queue 200 and write request queue 222 are next considered. In one implementation, read requests from every device interface must snoop pending write addresses in write request queue 222. This write request queue snooping preserves ordering from the perspective of each interface; if a device writes and then reads the same address, it needs to receive that just-written data. If the write were in the write request queue 222 and ignored, the read may receive obsolete data from main memory 104.

To complete the write and read request queue snoop quickly (e.g., in less than one clock cycle), write request queue snoop logic 610 and read request queue snoop logic 612 may be configured to compare only a subset of the addresses associated with the pending requests for snooping purposes. In one implementation, the snooping logic compares 14 bits of the addresses (e.g., bits 25:11 of the system address). It is understood that the selection of the number of bits for address comparison during the snooping operation is dependent upon the speed at which the comparison operation must be performed and depending upon the acceptable tolerance of performance degradation due to the increased possibility of false hits.

The snooping of previous requests within write request queue 222 may be implemented in various ways. In one implementation, if a write request queue hit occurs relating to a new read request from a particular interface, the read request is not acknowledged until a write request queue flush operation has occurred. All write operations prior to and including the write request operation which resulted in the snoop hit is serviced by memory controller 210. In this manner, the previous write operation to the same address is forced to complete previous to the read operation, thus ensuring coherency. After the write request queue flush has begun, the queue memory control unit 224 can load the read request into the read request queue 220, and a CPU snoop command for the read operation (if necessary) may be provided to CPU interface 204 to issue a CPU snoop for the read transaction.

In another implementation of the snooping of write request queue 222, a counter is associated with each location of read request queue 220. When a new read request is received by memory queue manager 206, the address residing in each location of the write queue 222 is compared with the address of the new read request (or a certain subset of the address bits are compared, as discussed above). If a snoop hit occurs with respect to a particular entry in write request queue 222, a value indicating the location of that entry is stored in the counter associated with the location of read requests queue 220 in which the new read request is loaded. The value thus indicates the depth of the hit in the write request queue 222. Each time a write request is de-queued from write request queue 222, the counter value associated with the read request is decremented by one. The count values associated with other read requests which contain valid values indicating the depths of snoop hits in the write request queue are similarly decremented. As read requests are de-queued from read request queue 220 and requests at the tail of the queue are shifted towards the head of the queue, the count value associated with each read request is shifted, unmodified, along with the read request. If a particular read request gets to the top of the queue with a count above zero, memory controller 210 will not service the request until additional write requests are serviced and the count value reaches zero.

Read request queue snooping may be similarly performed when a write request is asserted by an interface. More specifically, to avoid situations wherein memory controller may write ahead of a read transaction to the same address, which may occur if the write request almost full signal is asserted or another read is causing a write request queue flush, read request queue 220 is snooped before a write is loaded into write request queue 702. This snooping may run while the write data is still being gathered. If a hit occurs, the read request queue 220 is flushed until the hit condition goes away (i.e., the read request causing the hit is de-queued). Alternatively, a counter may be associated with each write request queue entry to track the number of read requests which should be serviced prior to servicing the write (i.e., a count value indicating the depth of a hit in read request queue 220 may be maintained, similar to the above description of the snooping of write request queue 222).

After snooping of the read request queue 220 occurs, memory queue manager 206 may further send a snoop request to the CPU interface 204. As stated previously, memory queue arbiter 626 temporarily departs from its normal priority scheme and starts servicing the CPU interface until the snoop results are available. If a cache hit occurs, memory queue arbiter 626 remains at CPU interface 204 until writeback data is sent from cache memory to main memory 104. After the write back request completes, memory queue arbiter 626 returns to the requesting interface. Once the snoop is finished and the memory queue arbiter 626 has returned to the requesting device interface, it loads the write request into write request queue 222 and proceeds to handle other requests as needed. It is noted that writeback data could be merged with data associated with an incoming write request using the byte enables of the write request as a mask. It is similarly noted that for certain read requests, after snooping of write request queue 222 occurs, memory queue manager 206 may send a snoop request to the CPU interface 204. Writeback data corresponding to a modified hit line may be snarfed and provided to the requesting interface prior to storage of the writeback data into main memory 104.

Referring back to FIG. 2, aspects regarding one implementation of PCI/AGP queue manager 208 will next be considered. As stated previously, PCI/AGP queue manager 208 is responsible for controlling requests passed between CPU interface 204, PCI interface 212 and AGP interface 214 that are not targeted to local memory (i.e., main memory 104).

Figure 7:
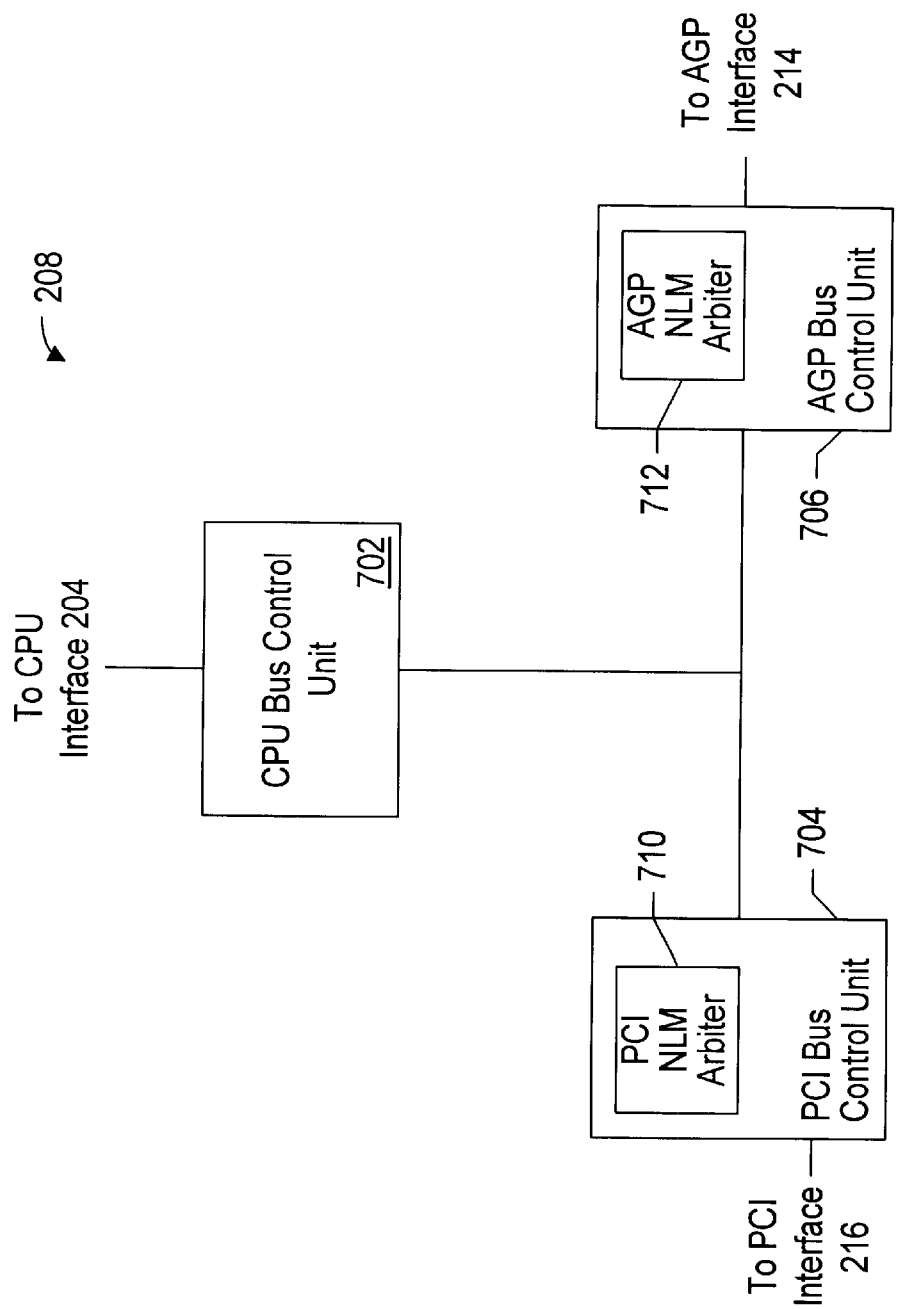
FIG. 7 is a block diagram of one embodiment of a non-local memory (PCI/AGP) queue manager.

FIG. 7 depicts a generalized block diagram of an embodiment of the PCI/AGP queue manager 208. A CPU bus control unit 702 is shown coupled to a PCI bus control unit 704 and an AGP bus control unit 706. A PCI NLM arbiter 710 is shown as a portion of the functionality of PCI bus control unit 704, and an AGP NLM arbitrator 712 is shown as a portion of the functionality of AGP bus control unit 706.

CPU bus control unit 702 is configured to route read and write requests from CPU interface 204 to a targeted device. Various additional address and control signals such as data acknowledges and retry signals may further be communicated back from a targeted device to CPU interface 204 through CPU bus control unit 702. In one embodiment, CPU bus control unit 702 does not support the pipelining of CPU cycles between different devices; however, CPU pipelining to a single device may be supported by CPU bus control unit 702.

There are two types of retry signals that may be returned from a target device. The first one, referred to as a "retry", may be asserted from either the PCI or AGP master interface on non-posted cycles from CPU 101, which indicates that the cycle was retried by a target on either the PCI or AGP bus. In this case, CPU interface 204 snoop stalls the CPU bus 103 until the retry signal is asserted. In one embodiment, CPU interface 204 always snoop stalls non-posted cycles so that in the event the target bus retries the cycle, CPU interface 204 can exit from the snoop phase by instructing CPU 101 to retry the cycle.

The second retry type is referred to as "fast retry", and can be asserted for two different reasons. The first case is a special case that involves PCI bus 114. If the FLUSHREQ_ signal is asserted, it is an indication from secondary bridge logic unit 116 (e.g., FIG. 1) that an ISA device might do some transfers across PCI bus 114 to main memory 104. The FLUSHREQ_ signal is used to not only flush out any pending CPU to PCI cycles, but it will also cause the PCI master interface 402 to assert a signal which causes all incoming CPU cycles targeted to PCI to be retried immediately once they enter their snoop phase. This prevents the CPU to PCI request buffer from getting filled again. The PCI NLM fast retry signal may also be provided to PCI bus control unit 704 to cause PCI NLM arbiter 710 to give priority to CPU bus control unit 702 in order to flush any CPU to PCI data. CPU interface 204 may further be configured such that, in such cases, a signal is sent back to PCI interface 216 indicating that incoming cycles on the CPU bus 103 which were targeted to PCI bus 114 were retried while the fast retry signal was asserted. This signal may be used to cause PCI master interface 402 to request ownership of PCI bus 114 in anticipation that incoming cycles are going to need to be run on PCI bus 114.

The second case in which a fast retry signal may be asserted involves a coherency issue. Whenever a PCI (or PCI device connected to AGP bus 110) requests a read from main memory 104 to read a flag set by CPU 101 indicating that a data transfer from the CPU to PCI (or AGP) has completed, any posted data from the CPU to PCI (or AGP) needs to be flushed to assure that the data transfer has actually completed. In this case, the PCI (or AGP) slave interface 410 asserts a fast retry signal when it detects that a PCI (or AGP) bus master has requested a read from memory. This prevents any more CPU cycles to PCI and AGP from being accepted by CPU interface 204, and may guarantee that there will be no snoop stalls run on CPU bus 103 for the CPU cycles that get retried. This may minimize the latency for getting snoop results back for the snoop cycle that will be run on CPU bus 103 (as a result of the memory read request). For this reason, whenever CPU interface 204 detects assertion of the fast retry signal, it will retry all cycles that are targeted for PCI bus 114 and PCI mode transfers on AGP bus 110. Further details regarding this operation are provided further below in connection with FIGS. 8A and 8B.

PCI bus control unit 704 includes PCI NLM arbiter 710 which is configured to arbitrate between write and read requests to PCI bus 114 from CPU interface 204. It is noted that PCI NLM arbiter 710 may further be configured to arbitrate requests from other buses, such as an IEEE 1394 bus or a USB bus, if connected. Once a device has won arbitration, PCI bus control unit 704 passes various request information to PCI master interface control unit 402 such as address, byte enables, and other control information. PCI NLM arbiter 710 employs a round-robin arbitration scheme. In addition, in one embodiment, PCI NLM arbiter 710 is advantageously configured to park on the CPU interface 204 any time there are no requests pending from any other requesting devices. An arbitration cycle occurs whenever the PCI master interface returns an address acknowledge while an address request is active, or when the arbiter is parked on CPU interface 204 and a request from a device other than CPU interface 204 is asserted. PCI NLM arbiter 710 may be configured to park on a winning device to allow multiple sequential quadword transfers. Furthermore, PCI NLM arbiter 710 may further be configured to support locked cycles from the CPU which will park the arbiter to the CPU interface. Additionally, when a fast retry signal is asserted from PCI interface 216, PCI NLM arbiter 710 will park to CPU interface 204 in order to flush out all CPU to PCI requests.

AGP bus control unit 706 is similarly provided to control requests to AGP interface 214. An AGP NLM arbiter 712 is configured to arbitrate between write and read requests from CPU interface 204, and write requests from PCI interface 216. It is noted that AGP NLM arbiter 712 may further be configured to arbitrate requests of additional buses, if incorporated. When a device has won arbitration, AGP bus control unit 706 passes the request to AGP interface 214, including address, byte enables, and other control information.

Similar to PCI NLM arbiter 710, AGP NLM arbiter 712 also employs a round-robin arbitration scheme, with parking on CPU interface 204 anytime there are no requests pending from any other requesting devices. AGP NLM arbiter 712 may further be configured to park on a particular requesting device during multiple sequential quadword transfers, and also supports locked cycles from the CPU interface which will park the AGP NLM arbiter on the CPU interface. If a fast retry signal is asserted by AGP slave interface 502, AGP NLM arbiter 712 will park to CPU interface 204 in order to flush out all CPU to AGP (PCI mode) requests.

Figure 8A:
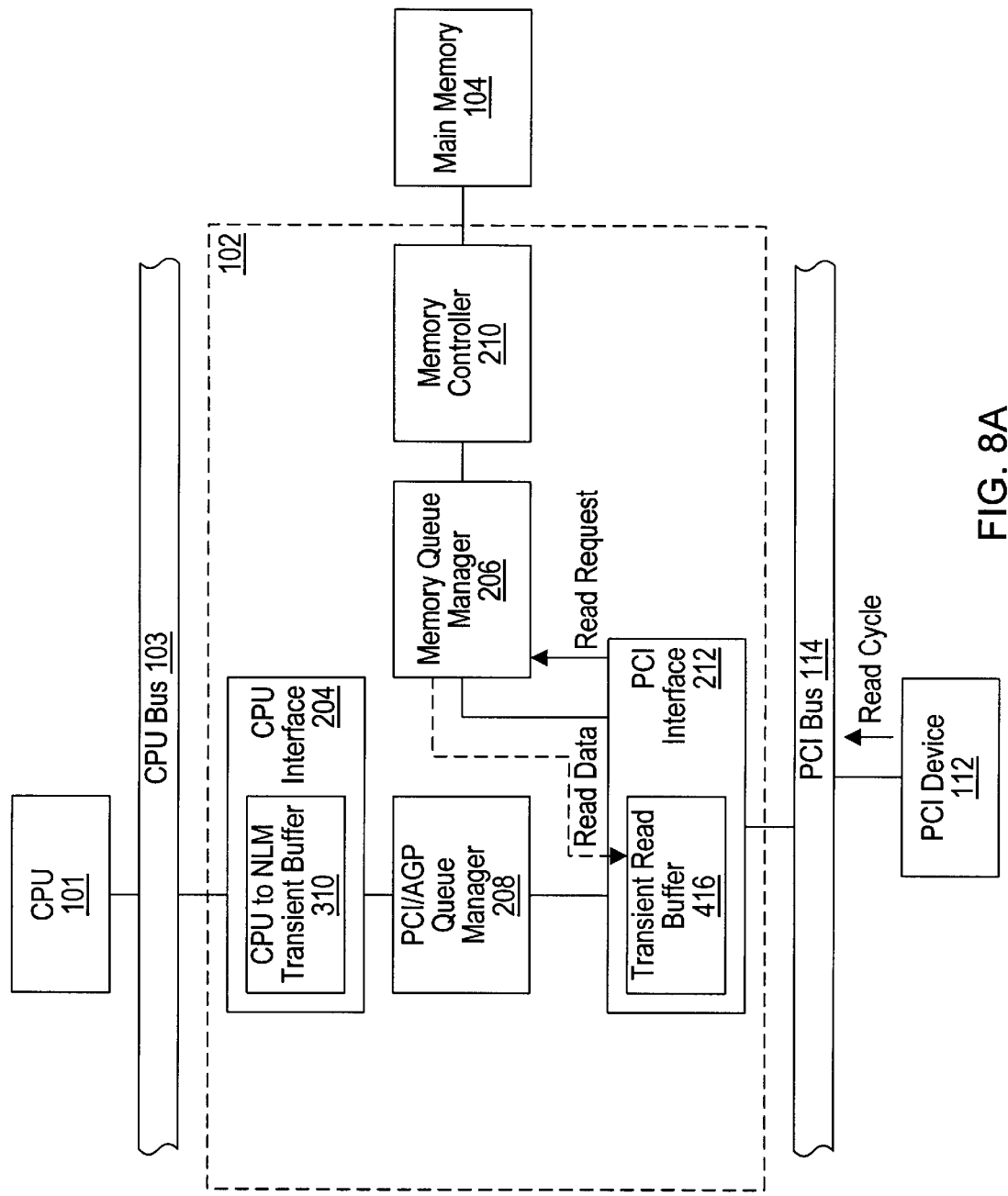
FIG. 8A is a block diagram of a computer system illustrating components associated with the blocking of CPU to PCI write posting when a PCI read from main memory is initiated.
Figure 8B:
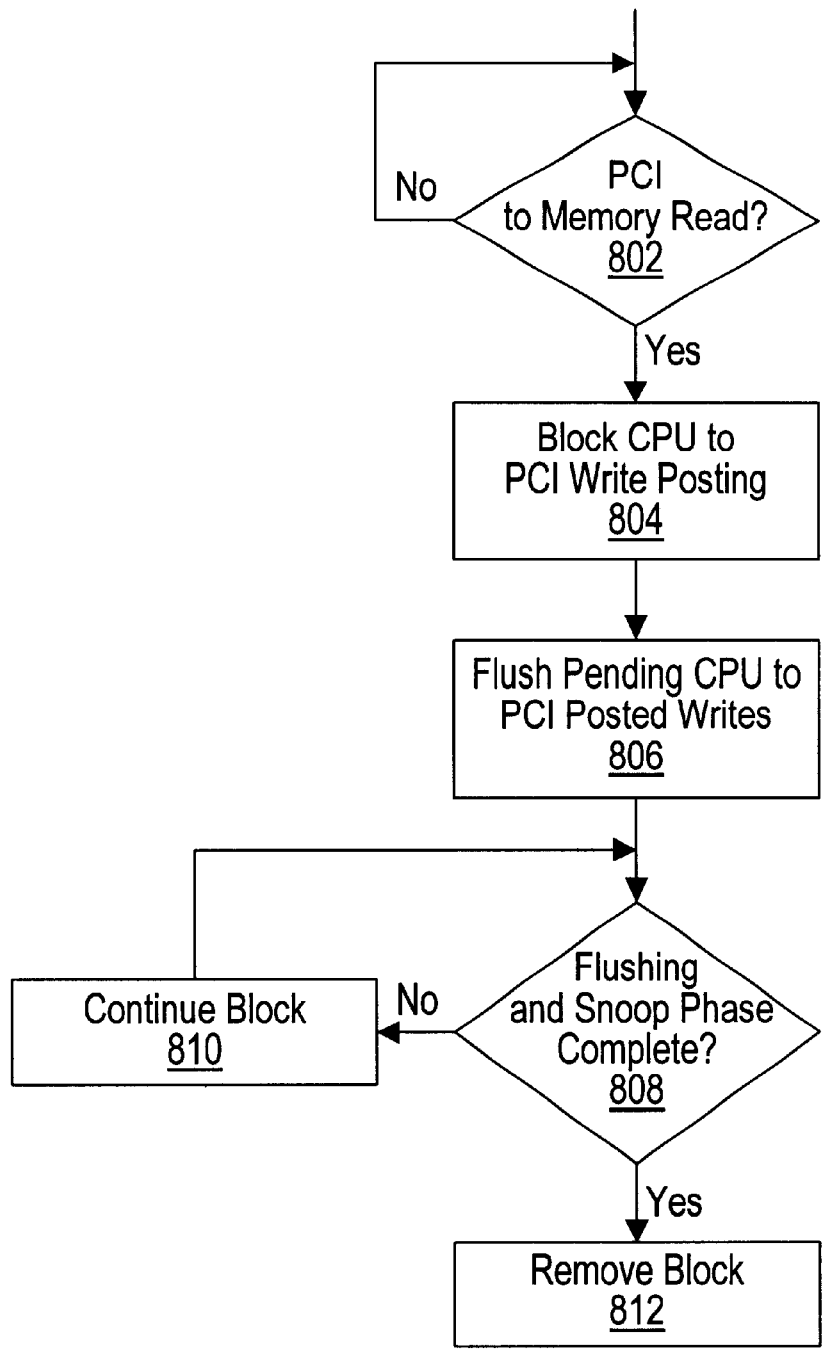
FIG. 8B is a block diagram illustrating the blocking of CPU to PCI write posting when a PCI read from main memory is initiated.

Turning next to FIGS. 8A and 8B, further aspects regarding the blocking of CPU to PCI write posting when a PCI read to main memory is initiated will next be considered. FIG. 8A is a diagram illustrating portions of computer system 100 associated with this blocking operation, and FIG. 8B is a flow diagram illustrating the blocking functionality. Circuit portions corresponding to those of previous figures are numbered identically for simplicity and clarity.

Referring collectively to FIGS. 8A and 8B, if a PCI device 112 initiates a read cycle on PCI bus 114 to read data from main memory 104, the cycle is detected by PCI interface 212 of bridge logic unit 102. As stated previously, PCI interface 212 may perform a delayed read operation in response to detection of such a cycle. PCI interface 212 accordingly provides a corresponding request to memory queue manager 206 to cause the data to be read from main memory 104. Eventually, the data will be provided to the PCI slave transient read buffer 416 of PCI interface 212.

When PCI interface 212 initially detects the read operation (step 802), a signal is provided to CPU interface 204 to prevent the posting of any further CPU to PCI write transactions and to flush any posted CPU to PCI transactions pending in bridge logic unit 102 (steps 804 and 806). This signal may be in the form of a fast retry signal, as discussed previously. In addition, as was also described previously, CPU interface 204 initiates a snoop cycle corresponding to the PCI read upon CPU bus 103.

The blocking of the posting of CPU to PCI write transactions is continued until any outstanding CPU to PCI transactions are flushed from the CPU to NLM transient buffer 310 of CPU interface 204 and when the snoop phase of the snoop cycle on CPU bus 103 completes (steps 808 and 810). At this point, the blocking of CPU to PCI write posting is removed (i.e., CPU to PCI write posting is re-enabled), even if the PCI device 112 has not yet re-attempted its read on PCI bus 114 and received the data from the PCI slave transient read buffer 416 (step 812).

The blocking of CPU to PCI write transactions as described above advantageously ensures memory coherency while accommodating high performance. Particularly, the system supports coherency in situations wherein the CPU writes data to a PCI device (which results in a posted write), the CPU sets a completion flag in main memory, and a PCI master checks the flag in main memory to determine if the data is available. The blocking mechanism as described above ensures that the write of data to the PCI device completes prior to reading of the flag by the PCI master.

It is noted that in one embodiment, after blocking is removed, subsequent speculative reads (i.e., a read operation performed by the PCI interface in an attempt to read ahead of the requesting master hoping that the requesting master will eventually read from that location) do not block CPU to PCI posting, further enhancing performance. Speculative read data is supplied to a requesting master as soon as the PCI master hits a speculative read address. It is also noted that the bridge may be configured to start adding wait states instead of retrying the requesting master once the CPU to PCI posting buffer has been flushed and the snoop phase of the snoop cycle that corresponds to the memory read operation completes. The bridge stops adding wait states and delivers the data to the requesting master once the data is received from the main memory (i.e., the PCI master may be retried several times either because the posted writes are not flushed or read data is not available. The bus bridge may be configured such that after the writes are flushed, wait states are added instead of retrying the PCI master).

Figure 9A:
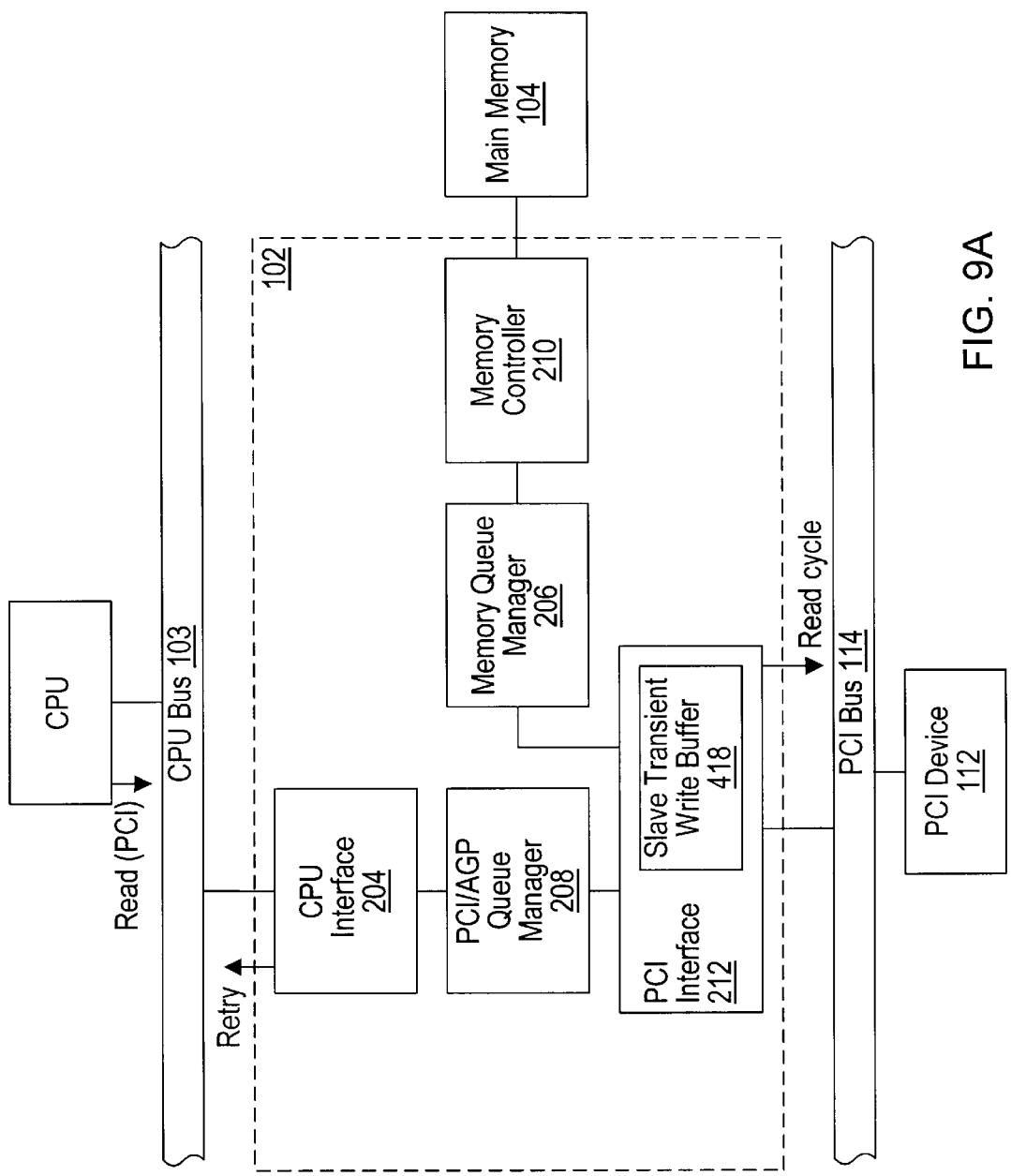
FIG. 9A is a block diagram of a computer system illustrating components associated with the blocking of PCI to memory write posting when a microprocessor performs a read from a PCI device.
Figure 9B:
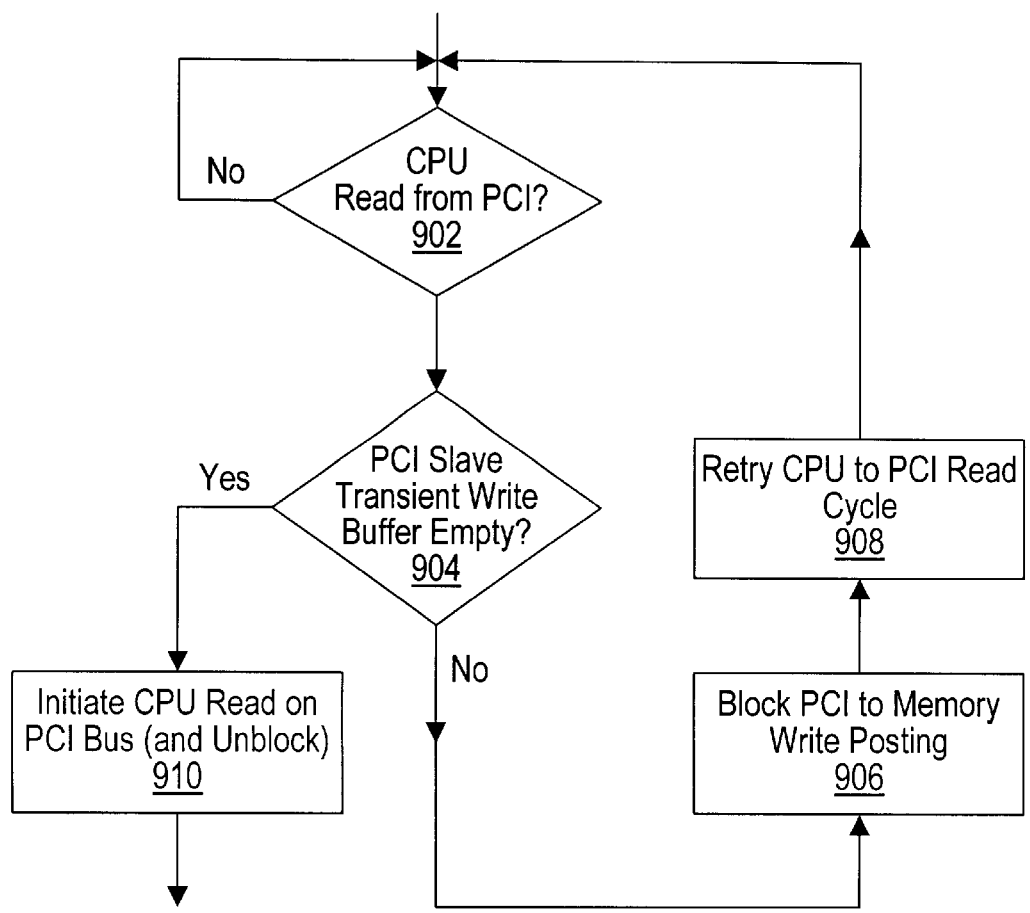
FIG. 9B is a flow diagram illustrating the blocking of posting of PCI to memory write transactions when a CPU to PCI read cycle is initiated.

Turning next to FIGS. 9A and 9B, the blocking of PCI to memory write posting when a CPU to PCI read cycle is initiated will next be considered. FIG. 9A is a block diagram illustrating various components of computer system 100 associated with this blocking operation, and FIG. 9B is a flow diagram illustrating the blocking operation. Again, circuit portions corresponding to those of previous figures are numbered identically for simplicity and clarity.

When CPU 101 initiates a read cycle on CPU bus 103 to read data from a PCI device (step 902), PCI interface 212 determines whether any posted PCI to memory transactions are pending within PCI slave transient write buffer 418. If no transactions are pending, the read cycle is accepted by bridge logic unit 102, and PCI interface 212 initiates a corresponding read cycle on PCI bus 114 to complete the read.

On the other hand, when CPU interface 204 detects a CPU to PCI read cycle and one or more posted memory write transactions are pending within PCI slave transient write buffer 418, PCI slave interface 410 blocks any further posting of PCI to memory transactions within PCI slave transient write buffer 418 (steps 904 and 906), and CPU interface 204 retries the read cycle on CPU bus 103 (step 908). The blocking of PCI to memory write posting is continued, and subsequent CPU to PCI read cycles initiated on CPU bus 103 are retried, as long as pending transactions remain in PCI slave transient write buffer 418. When all of the outstanding posted write transactions within PCI slave transient write buffer 412 are flushed and provided to memory queue manager 206, CPU interface 204 will accept a subsequent CPU to PCI read cycle initiated by CPU 101 (e.g., a CPU to PCI read cycle corresponding to a previously retried cycle). Upon initiation of the resulting read cycle by PCI interface 212 on PCI bus 114, the blocking of PCI to memory posting to PCI slave transient write buffer 418 is removed (step 910). This blocking operation advantageously ensures coherency upon occurrences of CPU to PCI read cycles, while allowing relatively high performance. Particularly, the system maintains coherency in situations where a PCI master writes data to main memory (resulting in the posting of the data in the bridge), and the CPU performs a read to the PCI device to check the data completion flag.

In one embodiment, if CPU 101 initiates a read, the blocking of posting of write transactions from PCI bus 114 to memory is maintained until the CPU 101 reads all the requested data.

It is noted that other specific implementations of various aspects of bridge logic unit 102 are possible. For example, additional request types may be supported by the bus interfaces, as desired, depending upon the overall requirements of the system. Furthermore, other specific implementations of the various bus interfaces as well as of a memory queue manager and a non-local memory manager are possible.

Numerous variations and modifications will become apparent to those skilled in the art once the above disclosure is fully appreciated. It is intended that the following claims be interpreted to embrace all such variations and modifications.

What is claimed is:

1. A computer system comprising:
   a microprocessor;
   a peripheral device;
   a main memory;
   a display apparatus operatively coupled to said main memory; and
   a bus interface unit coupled to provide an interface between said microprocessor, said main memory, and said peripheral device, wherein said bus interface includes:
      a CPU interface including a write posting buffer configured to post CPU write cycles to said peripheral bus; and
      a peripheral bus interface configured to receive a memory read request from said peripheral device, wherein said peripheral bus interface is configured to provide an indication to said CPU interface indicating receipt of said memory read request at said peripheral bus interface;
   wherein said CPU interface is configured to block acceptance of subsequent CPU to peripheral bus transactions in response to said indication until said write posting buffer is detected as being emptied.

2. The computer system as recited in claim 1 wherein said CPU interface is further configured to effectuate a snoop cycle upon said CPU bus in response to said read request received by said peripheral bus interface.

3. The computer system as recited in claim 2 wherein said CPU interface is configured to re-enable acceptance of CPU to peripheral bus transactions in response to detecting completion of a predetermined phase of said CPU snoop cycle and completion of said emptying of said write posting buffer.

4. The computer system as recited in claim 3 wherein said predetermined phase of said CPU snoop cycle is a snoop phase.

5. The computer system as recited in claim 2 wherein said CPU interface is further configured to unblock posting of CPU to peripheral bus write requests in said write posting buffer in response to detecting completion of said emptying of said write posting buffer and completion of a snoop phase of said snoop cycle.

6. The computer system as recited in claim 5 wherein said peripheral bus interface is configured to perform a delayed read operation in response to said memory read request.

7. The computer system as recited in claim 6 wherein said delayed read operation includes retrying said peripheral device and requesting data from said memory in response to said read request.

8. The computer system as recited in claim 7 wherein said indication includes an assertion of a fast retry signal, wherein said CPU interface is configured to retry said subsequent CPU to peripheral bus transactions while said fast retry signal is asserted.

9. The computer system as recited in claim 8 wherein said CPU interface is further configured to flush said write posting buffer in response to said fast retry signal.

10. The computer system as recited in claim 9 wherein said peripheral bus interface is configured to deassert said fast retry signal in response to completion of a snoop phase of said snoop cycle and completion of said emptying of said write posting buffer even if said peripheral device has not yet re-attempted said memory read request.

11. The computer system as recited in claim 10 wherein said peripheral bus interface is further configured to not assert said fast retry signal in response to a subsequent speculative read.

12. The computer system as recited in claim 11 wherein said peripheral bus interface is configured to supply data to a requesting master when a master device performs a read that hits a speculative read address.

13. A computer system comprising:
   a microprocessor,
   a main memory;
   a peripheral device coupled to a peripheral bus;
   a display apparatus operatively coupled to said main memory; and
   a bus bridge coupled to provide an interface between said microprocessor, said main memory and said peripheral bus, wherein said bus bridge is configured to block write posting of cycles from said microprocessor bus to said peripheral bus in response to initiation of a read cycle to said main memory by said peripheral device, wherein said bus bridge is configured to unblock said write posting in response to detecting completion of a snoop phase of a snoop cycle corresponding to said read cycle and completion of a flushing of posted CPU to peripheral bus write transactions pending in said bus bridge.

14. The computer system as recited in claim 13 wherein said peripheral device is a disk drive apparatus.

15. The computer system as recited in claim 13 wherein said bus bridge is configured to perform a delayed read operation in response to said read cycle.

16. A computer system comprising:

a microprocessor;

a peripheral device coupled to a peripheral bus;

a main memory coupled to a memory bus;

a display apparatus operatively coupled to said main memory; and a bus interface apparatus coupled to provide an interface between said processor bus, said memory bus and said peripheral bus, wherein said bus interface apparatus includes:

a peripheral bus interface including a memory write posting buffer for posting memory write requests initiated by said peripheral device; and a CPU interface coupled to said processor bus, wherein said CPU interface is configured to receive a read request initiated by said microprocessor to read from a device resident upon said peripheral bus;

wherein said peripheral bus interface is configured to disable write posting to said memory write posting buffer in response to said CPU interface detecting said read request from said microprocessor.

17. The computer system as recited in claim 16 wherein said CPU interface is configured to retry said read request initiated by said microprocessor until said memory write posting buffer is emptied.

18. The computer system as recited in claim 17 wherein said peripheral bus interface is further configured to re-enable posting to said memory write posting buffer in response to said read request being initiated upon said peripheral bus.

19. A computer system comprising:

a microprocessor coupled to a processor bus;

a peripheral device coupled to peripheral bus;

a main memory coupled to a memory bus;

a display operatively coupled to said main memory; and a bus bridge coupled to provide an interface between said processor bus, said peripheral bus and said memory bus, wherein said bus bridge is configured to detect a request to read data from said main memory by said peripheral device and to responsively block acceptance of transactions initiated by said microprocessor to said peripheral bus until a time at which said bus bridge detects that any outstanding posted writes from said microprocessor to said peripheral device are flushed and a snoop phase of a snoop cycle on said microprocessor bus corresponding to said read request is complete.

20. A computer system comprising:

a microprocessor;

a main memory;

a peripheral device coupled to a peripheral bus;

a display apparatus operatively coupled to said main memory; and a bus bridge coupled to provide an interface between said microprocessor, said main memory and said peripheral bus, wherein said bus bridge is configured to disable posting of write cycles from said peripheral device to said main memory in response to initiation by said microprocessor of a read cycle to said peripheral device and to re-enable said posting of write cycles from said peripheral device to said main memory in response to detecting a flushing of posted peripheral bus to main memory write transactions pending in said bus bridge.

21. The computer system as recited in claim 20 wherein said bus bridge is configured to retry said read cycle initiated by said microprocessor until said flushing of posted peripheral bus to main memory write transactions is completed.

22. The computer system as recited in claim 21 wherein said bus bridge is further configured to re-enable posting of peripheral bus to main memory write transactions in response to a read cycle being initiated upon said peripheral bus.

23. A method for maintaining coherency in a computer system including a bus bridge coupled to provide an interface between a microprocessor, a main memory and a peripheral device coupled to a peripheral bus, said method comprising:

said peripheral device initiating a cycle on said peripheral bus to read from said main memory;

said bus bridge blocking subsequent acceptance of transactions initiated by said microprocessor to said peripheral bus in response to initiation of said read cycle; and said bus bridge re-enabling subsequent acceptance of transactions initiated by said microprocessor to said peripheral bus in response to detecting completion of a snoop phase of a snoop cycle corresponding to said read cycle and completion of a flushing of posted CPU to peripheral bus write transactions pending in said bus bridge.

24. A method for maintaining coherency in a computer system having a bus bridge providing an interface between a microprocessor, a main memory and a peripheral device, said method comprising:

said microprocessor performing a read cycle to read data from said peripheral device;

said bus bridge blocking a posting of subsequent write cycles from said peripheral bus to said main memory if posted write requests are pending within a peripheral bus posting buffer of said bus bridge; and said bus bridge retrying said read cycle on a CPU bus.

25. The method as recited in claim 24 further comprising:

flushing said posted write requests pending within said peripheral bus posting buffer;

generating a read cycle on said peripheral bus in response to a subsequent read cycle initiated by said microprocessor; and said bus bridge unblocking said posting in response to said generating said read cycle on said peripheral bus.

* * * * *